US008649626B2

(12) United States Patent
Tsutsumi

(10) Patent No.: US 8,649,626 B2
(45) Date of Patent: Feb. 11, 2014

(54) IMAGE PROCESSING APPARATUS AND METHOD

(75) Inventor: Shohei Tsutsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 413 days.

(21) Appl. No.: 13/104,476

(22) Filed: May 10, 2011

(65) Prior Publication Data

US 2011/0293197 A1  Dec. 1, 2011

(30) Foreign Application Priority Data

Jun. 1, 2010 (JP) .................................. 2010-126291

(51) Int. Cl.
*G06T 5/00* (2006.01)
(52) U.S. Cl.
USPC ........... 382/254; 382/255; 382/260; 382/264; 348/208.1; 348/208.4; 348/208.13
(58) Field of Classification Search
CPC ............................ G06T 5/001; H04N 5/23248
USPC ............... 382/254, 255, 260, 264; 348/208.1, 348/208.4, 208.13
See application file for complete search history.

(56) References Cited

U.S. PATENT DOCUMENTS

| | | | |
|---|---|---|---|
| 7,002,624 B1 * | 2/2006 | Uchino et al. ............. | 348/225.1 |
| 7,580,620 B2 | 8/2009 | Raskar et al. | |
| 7,639,289 B2 | 12/2009 | Agrawal et al. | |
| 7,756,407 B2 | 7/2010 | Raskar | |
| 7,773,828 B2 * | 8/2010 | Sakata et al. ................... | 382/294 |
| 8,223,259 B2 | 7/2012 | Veeraraghavan et al. | |
| 8,237,804 B2 | 8/2012 | Torii | |
| 8,289,405 B2 | 10/2012 | Tsutsumi | |
| 8,311,282 B2 * | 11/2012 | Luo et al. ...................... | 382/103 |
| 8,379,097 B2 | 2/2013 | Torii | |
| 8,390,704 B2 | 3/2013 | Wang et al. | |
| 8,405,763 B2 | 3/2013 | Veeraraghavan et al. | |

(Continued)

FOREIGN PATENT DOCUMENTS

| | | |
|---|---|---|
| JP | 2006-074693 A | 3/2006 |
| JP | 2008-310797 A | 12/2008 |

OTHER PUBLICATIONS

Amit Agrawal, et al., "Coded Exposure Deblurring: Optimized Codes for PSF Estimation and Invertibility", IEEE Conference on Computer Vision and Pattern Recognition, Jan. 2009, pp. 2066-2073.

(Continued)

*Primary Examiner* — Matthew Bella
*Assistant Examiner* — Jose M Torres
(74) *Attorney, Agent, or Firm* — Fitzpatrick, Cella, Harper & Scinto

(57) ABSTRACT

A weighting coefficient sequence defining unit generates an array in which weighting coefficients are held at positions defined by the directional components of blur vectors, and adjusts the weighting coefficients to increase the sum of the frequency components of the array or reduce variations of the frequency components. A weighting unit multiplies respective captured images by corresponding weighting coefficients, generating L weighted captured images. The weighting unit then generates the synthesized image of the L weighted captured images. A corrected image generation unit performs deconvolution processing using the frequency component of the array in which the weighting coefficients are held at positions defined by the directional components of blur vectors, and the frequency component of the synthesized image. The corrected image generation unit performs an inverse frequency transform for the deconvolution processing result, generating an output image.

7 Claims, 22 Drawing Sheets

(56) References Cited

U.S. PATENT DOCUMENTS

| | | |
|---|---|---|
| 2007/0258706 A1 | 11/2007 | Raskar et al. |
| 2008/0062287 A1 | 3/2008 | Agrawal et al. |
| 2010/0182440 A1 | 7/2010 | McCloskey |
| 2010/0295953 A1 | 11/2010 | Torii et al. |
| 2010/0295954 A1 | 11/2010 | Kotani |
| 2010/0321509 A1 | 12/2010 | Torii |
| 2010/0321539 A1 | 12/2010 | Ito |
| 2011/0050920 A1 | 3/2011 | Siddiqui et al. |
| 2011/0075020 A1 | 3/2011 | Veeraraghavan et al. |
| 2011/0096995 A1 | 4/2011 | Ito |
| 2011/0129166 A1 | 6/2011 | Nishiyama |
| 2011/0292254 A1 | 12/2011 | Ito |
| 2012/0033096 A1 | 2/2012 | Jelinek |
| 2012/0195520 A1 | 8/2012 | Ishii |
| 2012/0262589 A1 | 10/2012 | Torii |

OTHER PUBLICATIONS

Abeed Sarker, et al., "Improved Reconstruction of Flutter Shutter Images for Motion Blur Reduction", 2010 International Conference on Digital Image Computing: Techniques and Applications, Dec. 2010, pp. 417-422.

Amit Agrawal, et al., "Optimal Single Image Capture for Motion Deblurring", IEEE Conference on Computer Vision and Pattern Recognition, Jun. 2009, pp. 2560-2567.

* cited by examiner

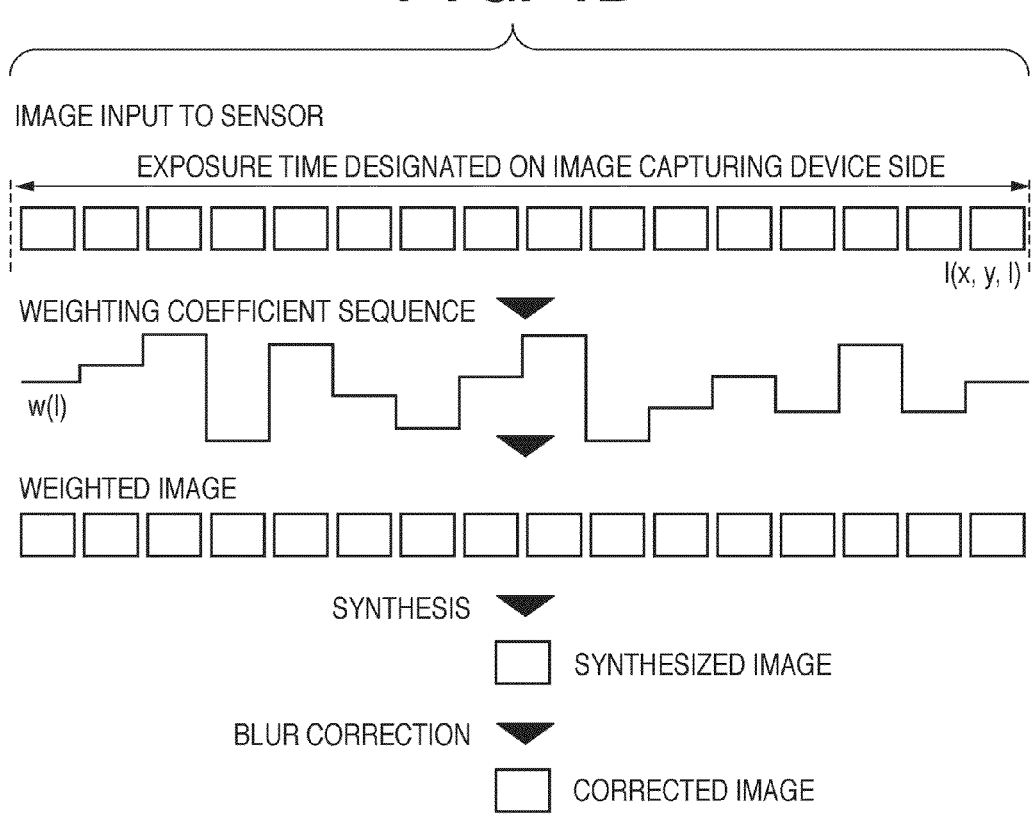

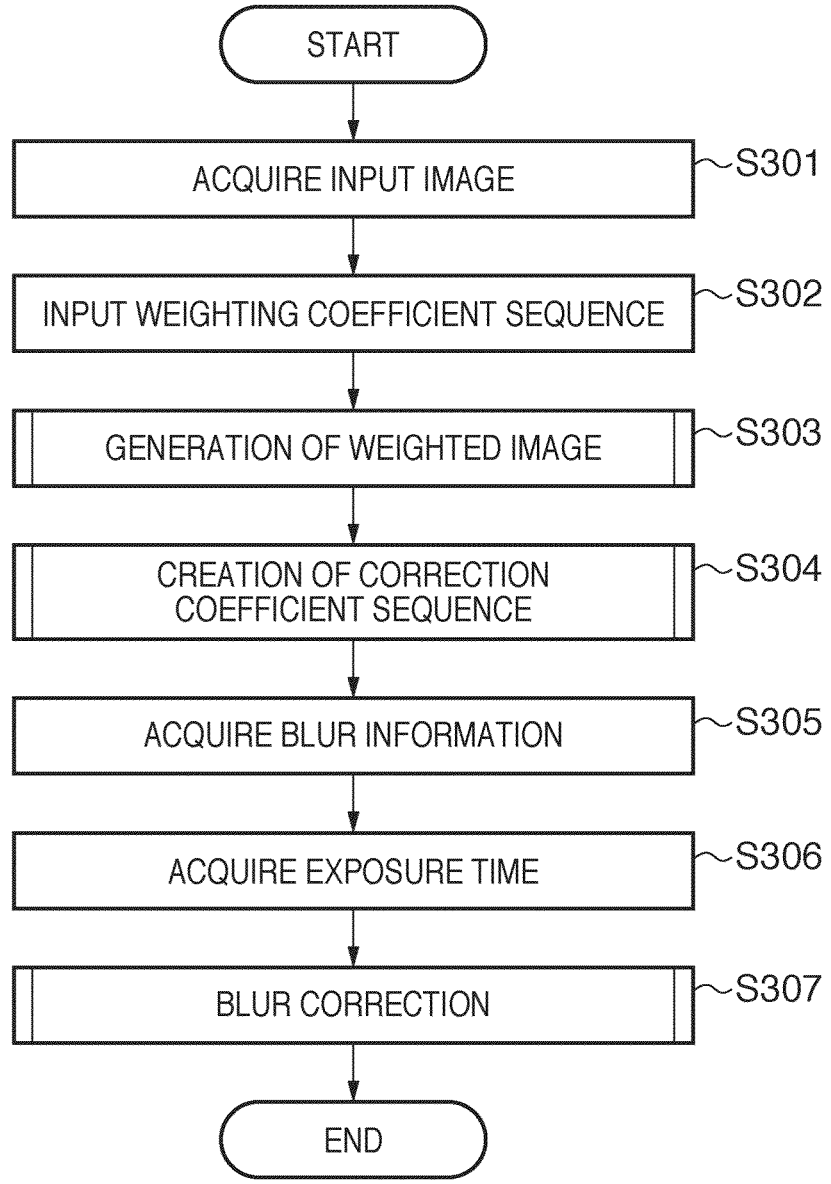

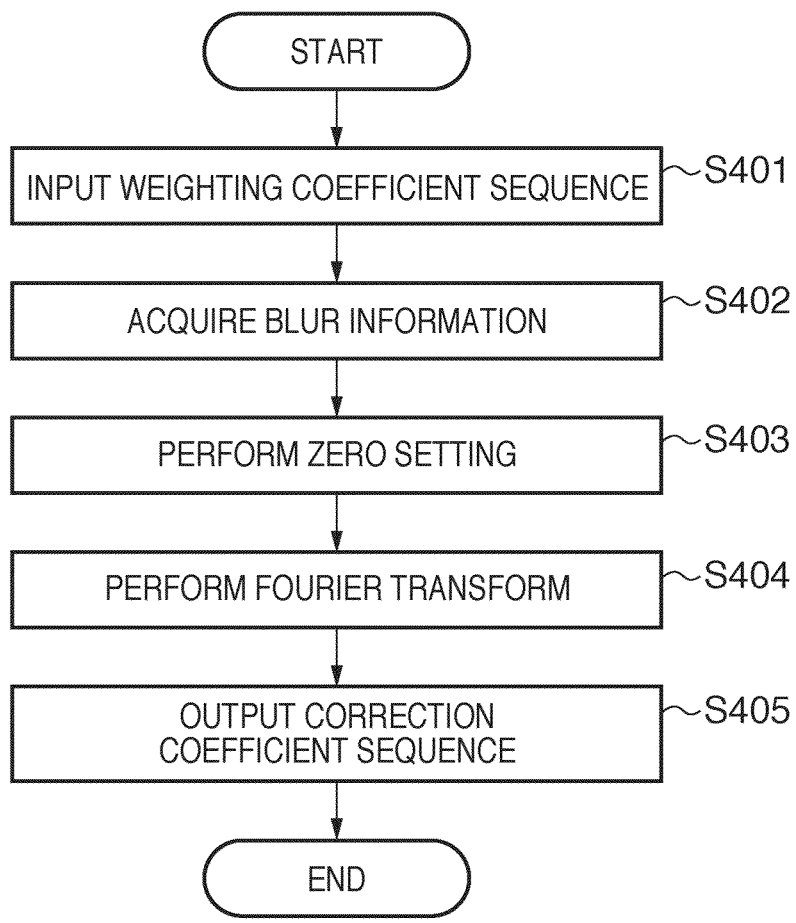

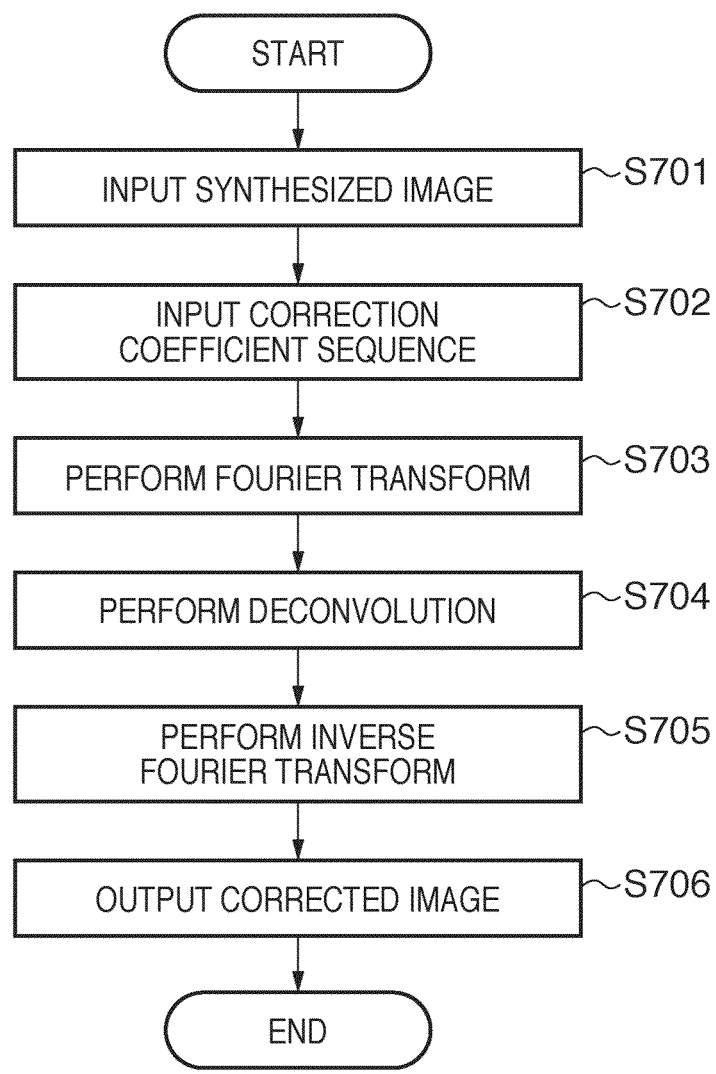

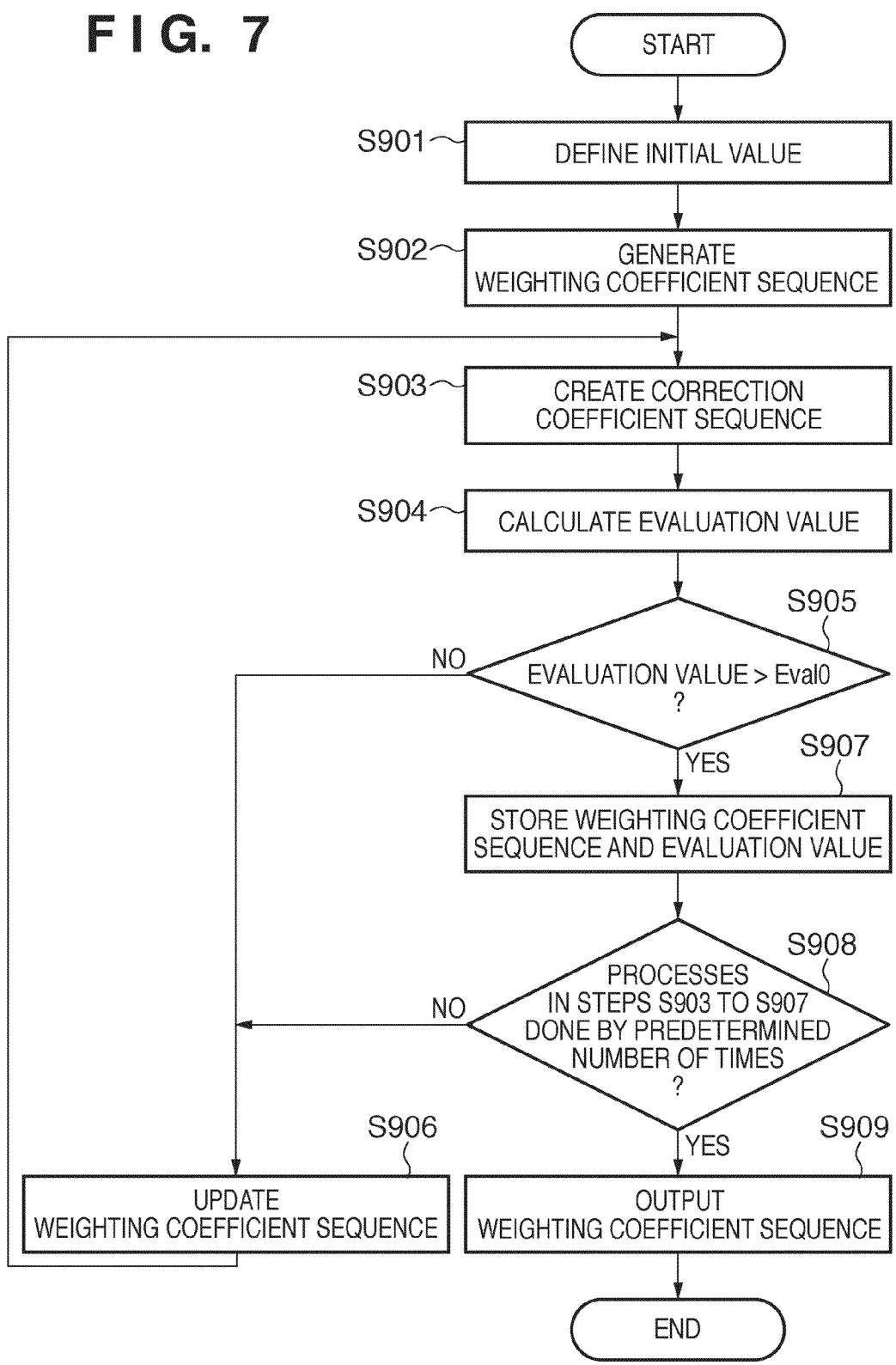

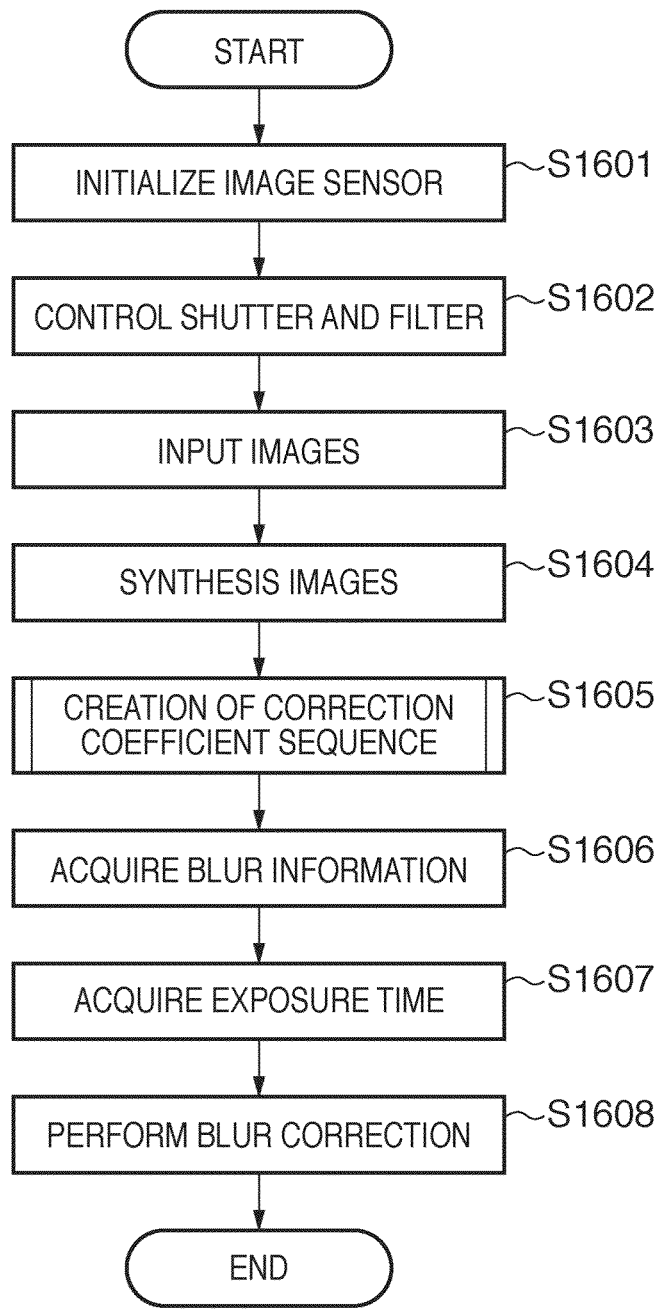

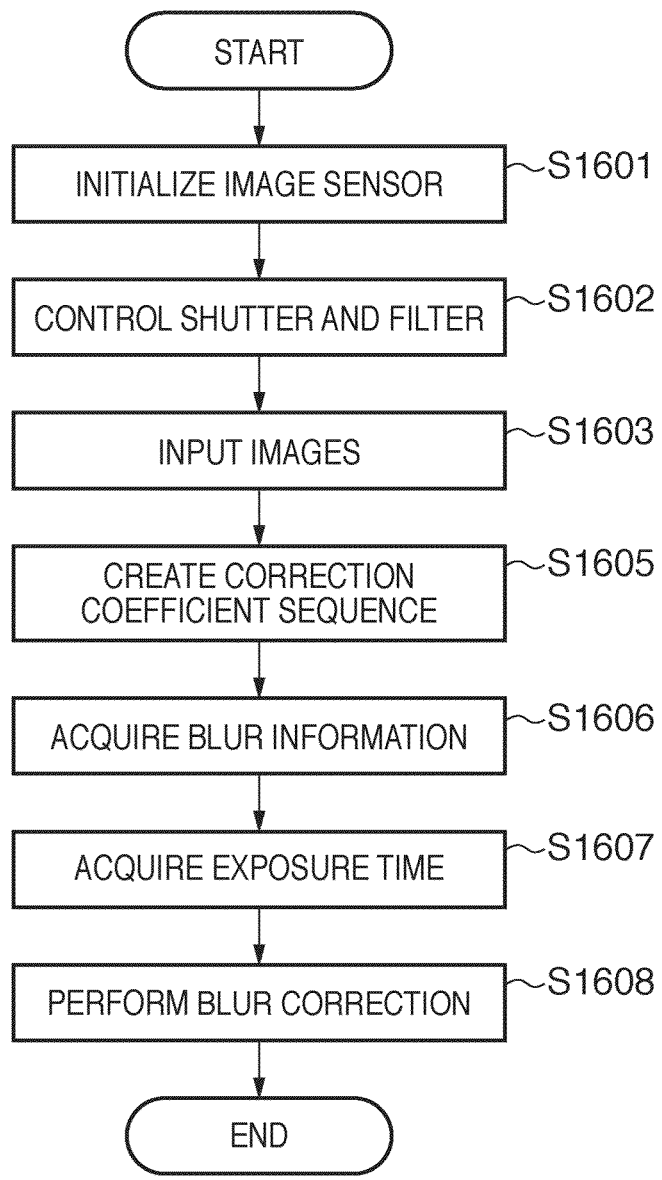

IMAGE PROCESSING APPARATUS AND METHOD

BACKGROUND OF THE INVENTION

1. Field of the Invention

The present invention relates to a blur correction technique for a captured image.

2. Description of the Related Art

A recent increase in the quality and zooming ratio of an image capturing device causes a problem in that a captured image is blurred by a camera shaking when capturing an image, which led to the wide use of image capturing devices with a camera shake correction (e.g. deblurring) function. Such an image capturing device with a camera shake correction function generally adopts an optical camera shake correction method to optically correct a camera shake using a gyro sensor configured to detect an angular velocity dependent on a camera shake and a driving device configured to control the relative positions of the lens and image sensor so as to cancel the camera shake.

An image capturing device is proposed that uses an electronic camera shake correction method (patent literature 1 (Japanese Patent Laid-Open No. 2006-074693)). This image capturing device generates an image in which the influence of a camera shake is suppressed by electronically aligning and superimposing a plurality of images after these images are captured at high shutter speed. The electronic camera shake correction method proposed in patent literature 1 does not require a gyro sensor and thus is advantageous in downsizing of the image capturing device and reduction of the manufacturing cost.

Further, a technique to encode opening/closing of a shutter at the time of exposure when one image is acquired, and correcting a blur by arithmetic processing using the flutter shutter information (patent literature 2 (U.S. Patent Application Publication No. 2007/0258706)) is proposed. This technique is called coded exposure. A blur distribution is measured using a gyro sensor or the like, and a point spread function (to be simply referred to as PSF) is estimated as the blur function of a point image on an image. The frequency characteristic of the PSF is calculated, and filtering is done using a filter having a characteristic opposite to the calculated frequency characteristic or a Wiener filter. This enables satisfactory blur correction.

However, the method proposed in patent literature 1 is premised on a captured image being free from camera shake, and images suffering camera shake cannot be accurately aligned with each other. When an image such as a night scene is captured, noise is readily applied to the captured image, and noise reduction requires a predetermined exposure time or longer. As the exposure time becomes longer, a captured image may more readily contain a camera shake component, resulting in insufficient alignment between images. In patent literature 1, even adding and synthesizing aligned images cannot satisfactorily correct a camera shake.

In patent literature 2, when the frequency response value of the PSF is small, the blur correction amount at this frequency becomes larger than those at other frequencies, failing in satisfactory blur correction. Especially when an image to be corrected contains noise, the noise is amplified, greatly degrading the corrected image. Since a non-exposure time period is generated during image capturing, the amount of noise applied to a captured image tends to increase. Noise in image capturing remains in a blur-corrected image (e.g. deblurred image).

SUMMARY OF THE INVENTION

The present invention has been made in consideration of the above-described problems, and provides a technique for generating a blur-corrected high-quality image by suppressing image degradation caused by blur correction.

According to the first aspect of the present invention, an image processing apparatus comprising: a first acquisition unit configured to acquire a weighting coefficient sequence including weighting coefficients by which respective captured image data captured by an image capturing device are to be multiplied, the weighting coefficient sequence including at least a ternary weighting coefficient; an input unit configured to input the plurality of captured image data captured by the image capturing device; a second acquisition unit configured to acquire a motion vector from an image represented by the captured image data when acquiring the plurality of captured image data; a synthesis unit configured to multiply the respective captured image data by corresponding weighting coefficients of the weighting coefficient sequence, and synthesize the respective captured image data multiplied by the weighting coefficients, acquiring synthesized image data; and a correction unit configured to correct the synthesized image data based on the motion vector and the weighting coefficient sequence, acquiring corrected image data.

According to the second aspect of the present invention, an image processing apparatus comprising: an input unit configured to input captured image data captured while changing a transmittance based on a weighting coefficient sequence including a plurality of weighting coefficients; an acquisition unit configured to acquire a motion vector from an image represented by the captured image data in the image capturing; and a correction unit configured to correct the captured image data based on the motion vector and the weighting coefficient sequence, acquiring corrected image data, wherein the weighting coefficient sequence includes at least a ternary weighting coefficient.

According to the third aspect of the present invention, an image processing method performed by an image processing apparatus, comprising: a first acquisition step, performed by a first acquisition unit of the image processing apparatus, of acquiring a weighting coefficient sequence including weighting coefficients by which respective captured image data captured by an image capturing device are to be multiplied, the weighting coefficient sequence including at least a ternary weighting coefficient; an input step, performed by an input unit of the image processing apparatus, of inputting the plurality of captured image data captured by the image capturing device; a second acquisition step, performed by a second acquisition unit of the image processing apparatus, of acquiring a motion vector from an image represented by the captured image data when acquiring the plurality of captured image data; a synthesis step, performed by a synthesis unit of the image processing apparatus, of multiplying the respective captured image data by corresponding weighting coefficients of the weighting coefficient sequence, and synthesizing the respective captured image data multiplied by the weighting coefficients, acquiring synthesized image data; and a correction step, performed by a correction unit of the image processing apparatus, of correcting the synthesized image data based on the motion vector and the weighting coefficient sequence, acquiring corrected image data.

According to the fourth aspect of the present invention, an image processing method performed by an image processing apparatus, comprising: an input step, performed by an input unit of the image processing apparatus, of inputting captured image data captured while changing a transmittance based on a weighting coefficient sequence including a plurality of weighting coefficients; an acquisition step, performed by an acquisition unit of the image processing apparatus, of acquiring a motion vector from an image represented by the captured image data in the image capturing; and a correction step, performed by a correction unit of the image processing apparatus, of correcting the captured image data based on the motion vector and the weighting coefficient sequence, acquiring corrected image data, wherein the weighting coefficient sequence includes at least a ternary weighting coefficient.

Further features of the present invention will become apparent from the following description of exemplary embodiments with reference to the attached drawings.

BRIEF DESCRIPTION OF THE DRAWINGS

FIG. 1B is a view showing the operation of whole blur correction;

FIG. 2 is a flowchart showing processing performed by an image processing unit 104;

FIG. 3 is a flowchart showing details of processing in step S304;

FIG. 5 is a flowchart showing details of processing in step S307;

FIG. 7 is a flowchart showing processing performed by the weighting coefficient sequence defining unit 112;

FIG. 13 is a flowchart showing processing performed by the image capturing unit 1401 and an image processing unit 1200;

FIG. 16 is a flowchart showing processing performed by an image processing unit 1500;

DESCRIPTION OF THE EMBODIMENTS

Embodiments of the present invention will now be described with reference to the accompanying drawings.

Each of the following embodiments is an example of concretely practicing the present invention, and is one detailed example of arrangements defined in the scope of claims.

[First Embodiment]

<Example of Functional Arrangement of Image Processing Apparatus>

Figure 1A:
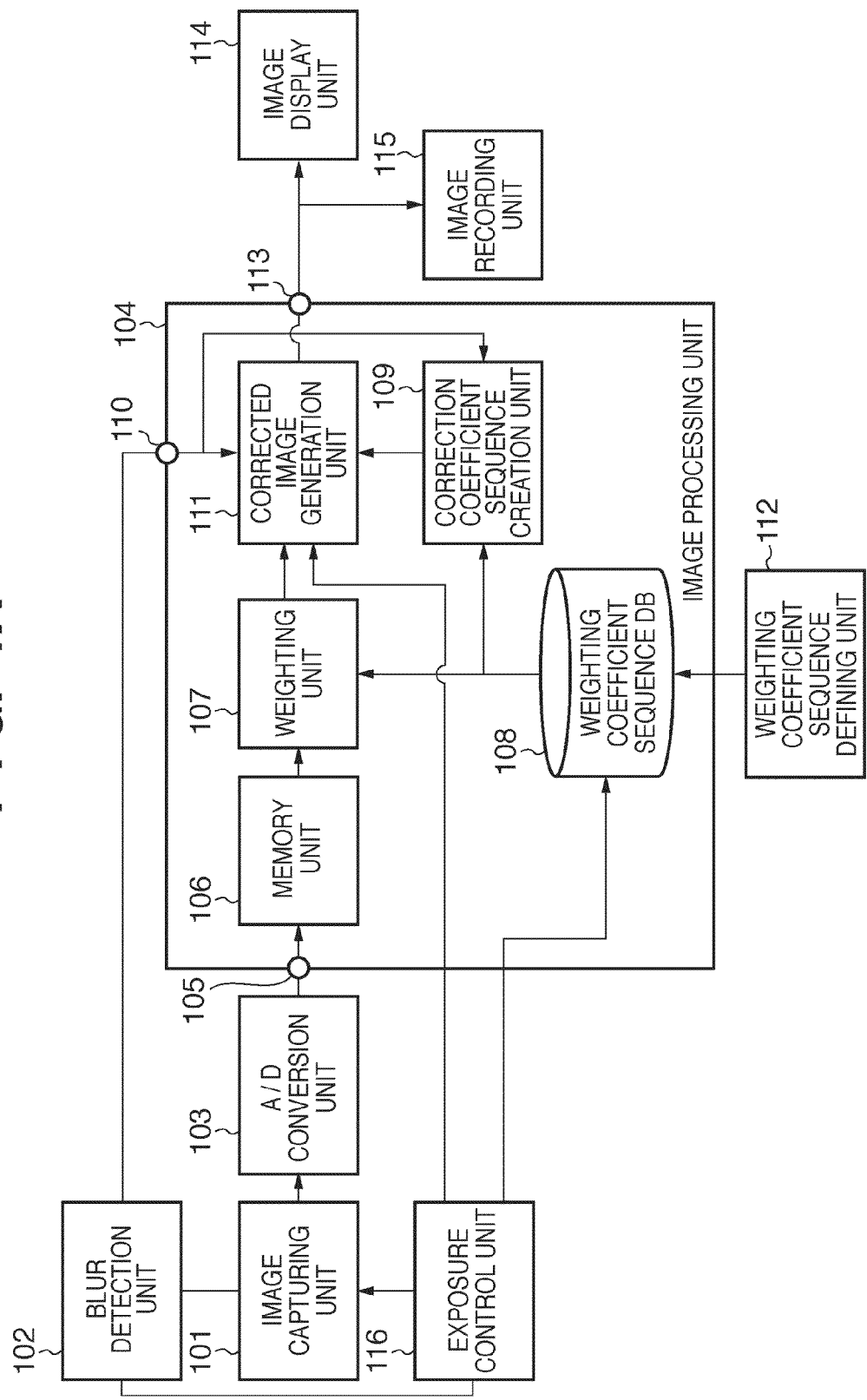
FIG. 1A is a block diagram exemplifying the functional arrangement of an image processing apparatus.

The functional arrangement of an image processing apparatus according to the first embodiment will be exemplified with reference to the block diagram of FIG. 1A. The first embodiment will explain the image processing apparatus as an image capturing device such as a digital camera. The image capturing device generates one blur-corrected image using a plurality of captured images obtained by performing exposure a plurality of number of times.

An image capturing unit 101 includes an imaging lens unit, a semiconductor image sensor such as a CMOS sensor or CCD sensor, and a shutter. The image capturing unit 101 generates the image signal of an image capturing target, and sends it to an A/D conversion unit 103 on the subsequent stage.

A blur detection unit 102 detects a change of the posture of the image capturing device, that is, a blur vector (blur information) indicating the magnitude and direction of a blur. The blur detection unit 102 outputs the detected blur information to an image processing unit 104. In the first embodiment, the blur detection unit 102 suffices to detect blur information obtained when the image capturing unit 101 captured an image. In other words, it suffices to acquire blur information in image capturing for each captured image.

An exposure control unit 116 controls the exposure time in the image capturing unit 101. Note that the blur detection unit 102 and exposure control unit 116 operate in synchronization with each other. More specifically, the blur detection unit 102 starts detecting a blur when the exposure control unit 116 starts exposure, and ends the blur detection when the exposure control unit 116 ends the exposure.

The A/D conversion unit 103 converts an image signal output from the image capturing unit 101 into a digital image signal having a predetermined format, and outputs the digital image signal to the image processing unit 104. For example, when the image signal represents a still image, the A/D conversion unit 103 converts it into a digital image signal having a standard still image format such as JPEG. When the image signal represents a moving image, the A/D conversion unit 103 converts it into a digital image signal having a standard moving image format such as MPEG.

The image processing unit 104 generates a blur-corrected image from captured images represented by digital image signals sequentially input from the A/D conversion unit 103. The image processing unit 104 sends the generated blur-corrected image to an image display unit 114 and image recording unit 115. Details of the image processing unit 104 will be described later.

The image display unit 114 displays the blur-corrected image on the liquid crystal screen of the image capturing device. The image recording unit 115 records the blur-corrected image in the internal memory of the image capturing device, a memory detachable from the image capturing device, or the like.

Next, the image processing unit 104 will be described in more detail. Data of a captured image represented by a digital image signal output from the A/D conversion unit 103 is input to the image processing unit 104 via an input terminal 105, and stored in a memory unit 106. As described above, in the first embodiment, the image capturing unit 101 obtains a plurality of captured images by performing exposure a plurality of number of times. Thus, the memory unit 106 stores data of a captured image obtained in every exposure.

A weighting unit 107 sequentially reads out captured images stored in the memory unit 106, and multiplies the readout captured images by corresponding weighting coefficients of a weighting coefficient sequence stored in a weighting coefficient sequence DB (database) 108. The weighting unit 107 can generate images (weighted captured images) by multiplying respective captured images stored in the memory unit 106 by corresponding weighting coefficients. Note that a weighting coefficient sequence defining unit 112 creates (adjusts) in advance the weighting coefficient sequence stored in the weighting coefficient sequence DB 108. The weighting unit 107 synthesizes the weighted captured images, generating one synthesized image. The weighting unit 107 sends the synthesized image to a corrected image generation unit 111.

A correction coefficient sequence creation unit 109 generates a correction coefficient sequence for use in the corrected image generation unit 111 by using the weighting coefficient sequence stored in the weighting coefficient sequence DB 108 and blur information input from the blur detection unit 102 via an input terminal 110. The correction coefficient sequence creation unit 109 sends the generated correction coefficient sequence to the corrected image generation unit 111.

By using the following three pieces of information, the corrected image generation unit 111 performs blur correction processing for a synthesized image generated by the weighting unit 107, and generates a blur-corrected image serving as an image to be output finally:

the exposure time controlled by the exposure control unit 116 (exposure time taken to obtain all captured images stored in the memory unit 106)

a correction coefficient sequence created by the correction coefficient sequence creation unit 109 blur information input from the blur detection unit 102 via the input terminal 110

The corrected image generation unit 111 sends the blur-corrected image to the image display unit 114 and image recording unit 115 via an output terminal 113. Note that a controller (not shown) such as the CPU of the image capturing device controls the operations of the building units of the image capturing device.

<Blur Correction by Coded Exposure>

A conventionally general method, that is, a "method of correcting a blur using flutter shutter information used in coded exposure", will be explained. Letting i(x, y) be the intensity of incident light per unit time at a pixel position (x, y), a be the blur speed of the image capturing device, and T be the exposure time, the image capturing device receives information obtained by changing i(x, y) by "at" at time t. Hence, a captured image $i_{blur}(x, y)$ is given by equation (1):

$$i_{blur}(x, y) = \frac{1}{T}\int_0^T i(x, y + at)h(t)dt \qquad (1)$$

where h(t) is the function which indicates an exposure condition and takes a value of 1 or 0. h(t)=1 means that the shutter is open at time t, and h(t)=0 means that the shutter remains closed at time t. For descriptive convenience, a case in which a blur has occurred in the vertical direction (y direction) in image capturing will be exemplified. Assume that the blur speed a of the image capturing device is constant during image capturing. A convolution operation in a real space can be described in the form of a product for the spatial frequency.

From this, executing a Fourier transform on the two sides of equation (1) expressing a captured image acquisition process yields $$I_{blur}(u, v) = \frac{1}{aT}I(u, v)H(u, v) \qquad (2)$$

where $I_{blur}(u, v)$, I(u, v), and H(u, v) are the Fourier transform results of $i_{blur}(x, y)$, i(x, y), and h(t), respectively. Note that u is the frequency of the x component, and v is that of the y component. Rewriting equation (2) for I(u, v) yields $$I(u, v) = \frac{aT}{H(u, v)}I_{blur}(u, v) \qquad (3)$$

In equation (3), assume that the exposure time T is a known parameter, and the blur speed a of the image capturing device can be acquired from the blur detector of the image capturing device. $I_{blur}(u, v)$ and H(u, v) can be obtained by a Fourier transform for the captured image $i_{blur}(x, y)$ and exposure condition h(t) and thus are known. By solving equation (3), the Fourier transform result I(u, v) of the captured image i(x, y) can be derived.

Finally the derived I(u, v) undergoes an inverse Fourier transform, obtaining a blur-free image i(x, y). This is the method of correcting a blur using flutter shutter information in coded exposure.

Equation (3) can remove a blur from an image in principle, but the Fourier transform result H(u, v) of h(t) sometimes takes 0 depending on the exposure condition of the image capturing device. In this case, so-called "zero division" occurs on the right-hand side of equation (3). The solution I(u, v) of equation (3) cannot be obtained correctly, and blur correction becomes insufficient. To avoid insufficient blur correction due to "zero division", the shutter is opened/closed at random in coded exposure.

<Blur Correction According to First Embodiment>

In the first embodiment, the exposure pattern in coded exposure is implemented not by the shutter opening/closing pattern but by the pattern (weighting coefficient sequence) of weighting coefficients for respective captured images (FIG. 1B). More specifically, the first embodiment adopts the weighting coefficient sequence of weighting coefficients each of which can take an arbitrary value (positive value, 0, or negative value) instead of h(t) which takes a binary value of 0 or 1. This weighting coefficient sequence suffices to include at least a ternary value. For example, the weighting coefficient sequence may include a ternary value which takes a positive value.

Processing performed by the image processing unit 104 will be explained with reference to FIG. 2 which is a flowchart showing this processing. The image processing unit 104 sequentially receives, via the input terminal 105, L (L>1) captured images obtained by performing time-division exposure (exposure method (FIG. 1B) of dividing the exposure time into short time units and executing exposure) by the image capturing unit 101. In step S301, the image processing unit 104 stores the received captured images in the memory unit 106. In this case, i(l) is the lth (l=1, . . . , L: L is the total number of captured images obtained within the exposure time T) captured image stored in the memory unit 106, and i(x, y; l) is the pixel value at the pixel position (x, y) in the captured image i(l).

In step S302, the weighting unit 107 reads out a weighting coefficient sequence stored in the weighting coefficient sequence DB 108. The weighting coefficient sequence includes weighting coefficients for the L respective captured images, and is expressed as the weighting coefficient sequence w=[w(1), ..., w(L)]. That is, a weighting coefficient for the captured image i(l) is w(l).

In step S303, the weighting unit 107 multiplies the L respective captured images by corresponding weighting coefficients to generate L weighted captured images, and synthesizes the L generated weighted captured images to generate one synthesized image $i_{blur}$. A pixel value at the pixel position (x, y) in one synthesized image $i_{blur}$ is calculated in accordance with equation (4):

$$i_{blur}(x, y) = \sum_{l=1}^{L} i(x, y; l) w(l) \quad (4)$$

By executing calculation based on equation (4) for each pixel position, one synthesized image $i_{blur}$ can be generated.

The weighting coefficient sequence w for L=15 is $$w(l)=[-2.43, 0.93, -1.31, 0.73, -0.43, 0.78, -0.48,$$
$$2.00, 2.15, -1.00, 0.59, -1.12, -0.85, 0.19, 0.50] \quad (5)$$

The weighting unit 107 sends one generated synthesized image $i_{blur}$ to the corrected image generation unit 111. Details of the processing in step S303 will be described later with reference to FIG. 19.

In step S304, by using blur information received from the blur detection unit 102 via the input terminal 110 and the weighting coefficient sequence w read out from the weighting coefficient sequence DB 108, the correction coefficient sequence creation unit 109 generates a correction coefficient sequence for use in blur correction by the corrected image generation unit 111. Details of the processing in step S304 will be described later with reference to FIG. 3.

In step S305, the corrected image generation unit 111 acquires the blur information input from the blur detection unit 102 via the input terminal 110. The blur information is formed from pieces of blur information detected by the blur detection unit 102 when the L respective captured images were obtained.

In step S306, the corrected image generation unit 111 acquires the exposure time T from the exposure control unit 116. In step S307, the corrected image generation unit 111 performs blur correction processing for the synthesized image $i_{blur}$ using the blur information acquired in step S305, the exposure time T acquired in step S306, and the correction coefficient sequence generated by the correction coefficient sequence creation unit 109. The corrected image generation unit 111 sends the blur-corrected image as an output image to the image display unit 114 and image recording unit 115 via the output terminal 113. Details of the processing in step S307 will be described later with reference to FIG. 5.

<Generation of Synthesized Image $i_{blur}$>

Figure 19:
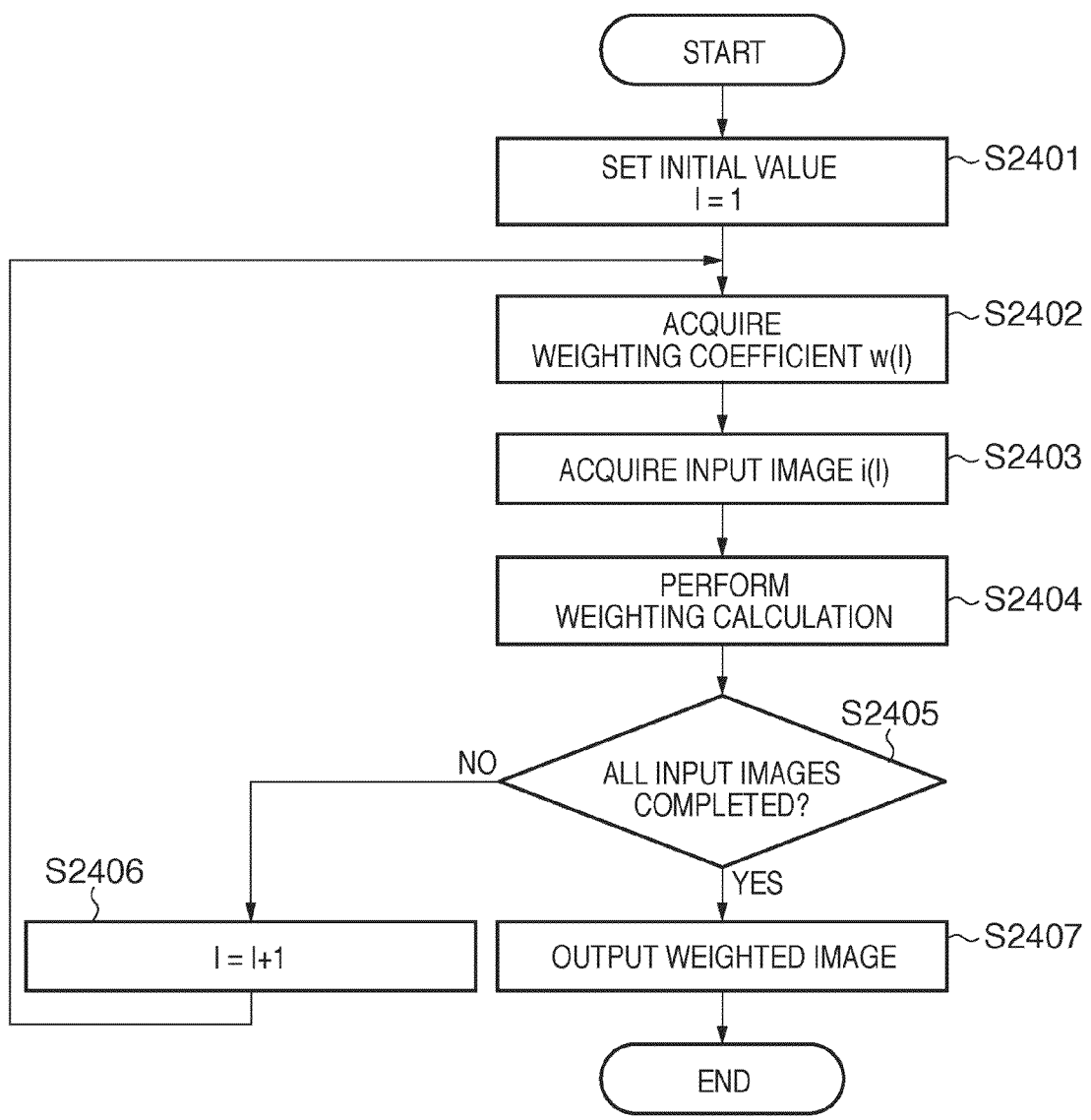
FIG. 19 is a flowchart showing details of processing in step S303.

The processing in step S303, that is, processing of generating one synthesized image $i_{blur}$ will be explained with reference to FIG. 19 which is a flowchart showing this processing. In step S2401, the weighting unit 107 initializes the variable l to 1.

In step S2402, the weighting unit 107 acquires the weighting coefficient w(l) corresponding to the captured image i(l) in the weighting coefficient sequence acquired from the weighting coefficient sequence DB 108. In step S2403, the weighting unit 107 reads out the captured image i(l) from the memory unit 106.

In step S2404, the weighting unit 107 multiplies, by the weighting coefficient w(l), the pixel value of each pixel which forms the captured image i(l), generating a weighted captured image l. In step S2405, the weighting unit 107 determines whether l=L. If l=L as a result of the determination, the process advances to step S2407; if l<L, to step S2406.

In step S2406, the weighting unit 107 increments the value of the variable l by one, and repeats the processes in step S2402 and subsequent steps. In step S2407, the weighting unit 107 superimposes and synthesizes weighted captured images 1 to L generated by the above processing, generating the synthesized image $i_{blur}$. The weighting unit 107 sends the generated synthesized image $i_{blur}$ to the corrected image generation unit 111.

<Generation of Correction Coefficient Sequence>

The processing in step S304, that is, processing of generating a correction coefficient sequence will be explained with reference to FIG. 3 which is a flowchart showing this processing. In step S401, the correction coefficient sequence creation unit 109 reads out the weighting coefficient sequence w from the weighting coefficient sequence DB 108.

In step S402, the correction coefficient sequence creation unit 109 acquires "pieces of blur information when the L respective captured images were obtained" input from the blur detection unit 102 via the input terminal 110. S_x(l) is the x component of a blur vector indicated by blur information for the captured image i(l), and S_y(l) is the y component.

In step S403, the correction coefficient sequence creation unit 109 generates an array w' having the same size as the size (for example, a size of P pixels×Q pixels) of the captured image in accordance with equation (6) (zero setting):

$$\text{for } 0 \leq l \leq L, \; w'(S\_x(l), S\_y(l))=w(l) \text{ otherwise, } w'(x, y)=0 \quad (6)$$

In step S404, the correction coefficient sequence creation unit 109 performs a 2D Fourier transform for the array w' generated in step S403 to generate the 2D Fourier transform result W of the array w' by performing calculation processing in accordance with equation (7):

$$W(u, v)=FFT2(w'(x, y)) \quad (7)$$

where FFT2( ) is the function of performing a 2D Fourier transform, and u and v are frequencies which are normalized to −1≤u≤1 and −1≤v≤1. In step S405, the correction coefficient sequence creation unit 109 sends the weighting coefficient sequence W obtained by the 2D Fourier transform as a correction coefficient sequence to the corrected image generation unit 111.

Figure 4A:
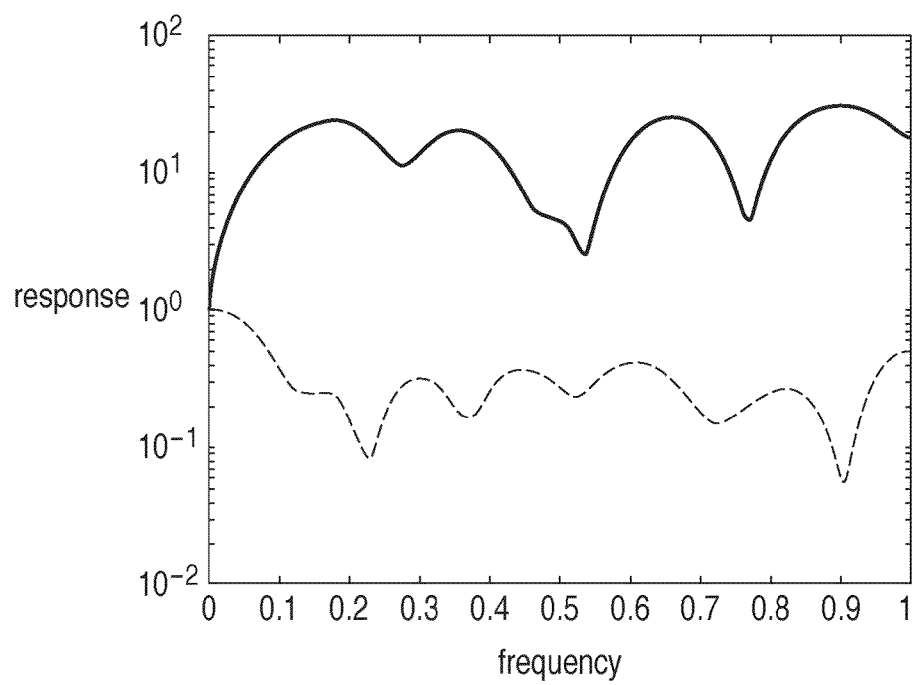
FIGS. 4A and 4B are graphs each showing a 1D Fourier transform result.
Figure 4B:
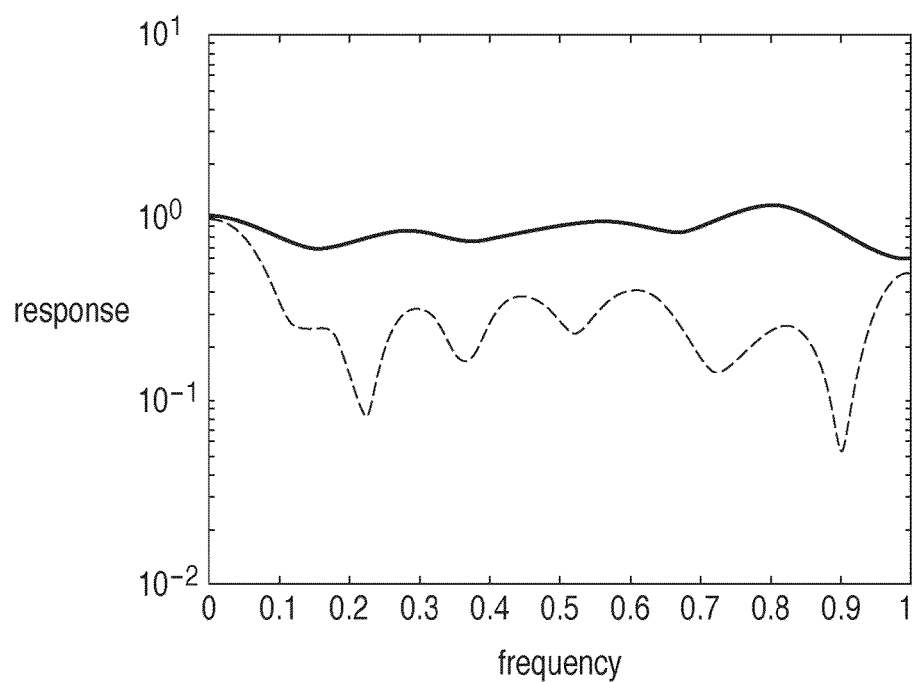

FIGS. 4A and 4B are graphs each obtained by plotting a 1D Fourier transform W'(u) at portions where the weighting coefficient sequence w is stored, out of w'(x, y). For descriptive convenience, FIGS. 4A and 4B show the 1D Fourier transform W'(u) when a blur has occurred in the vertical direction (y direction). In FIGS. 4A and 4B, the abscissa indicates the frequency u, and positive frequencies within the range of 0≤u≤1 are plotted. The ordinate indicates the logarithm of a response value at each frequency, and each response value is normalized by the value of the DC component (u=0). In FIGS. 4A and 4B, the solid line indicates the frequency response value of the weighting coefficient sequence w defined by equation (5). For comparison, the dotted line indicates a frequency response value derived from a weighting coefficient sequence w2 set by equation (8):

$$w2(l)=[1, 0, 0, 0, 1, 0, 0, 1, 1, 0, 1, 0, 1, 1, 1] \quad (8)$$

FIGS. 4A and 4B reveal that the response value becomes higher than the DC component in the entire frequency band when the weighting coefficient sequence w is used. Also, it can be confirmed that frequencies with small response values appear at several portions when the weighting coefficient takes a binary state of 1 or 0, as represented by the weighting coefficient sequence w2. The appearance of frequencies with small response values inhibits implementation of satisfactory blur correction, which will be described later.

Each weight value of the weighting coefficient sequence w obtained in the first embodiment is set for a corresponding captured image, so all the L captured images can be used for blur correction processing. In blur correction based on coded exposure described in patent literature 1, a non-exposure time period is generated during image capturing, and the image tends to contain a large amount of random noise generated in image acquisition. The first embodiment which performs blur correction or blur modification/removal using all the L captured images can cancel random noise generated in image capturing.

<Blur Correction Processing>

The processing in step S307, that is, blur correction processing for a synthesized image generated by the weighting unit 107 will be explained with reference to FIG. 5 which is a flowchart showing this processing. In step S701, the corrected image generation unit 111 acquires the synthesized image $i_{blur}$ from the weighting unit 107. In step S702, the corrected image generation unit 111 acquires a correction coefficient sequence W(u, v) from the correction coefficient sequence creation unit 109.

In step S703, the corrected image generation unit 111 performs a 2D Fourier transform for the synthesized image $i_{blur}$ in accordance with equation (9), generating the 2D Fourier transform result $I_{blur}$ of the synthesized image $i_{blur}$:

$$I_{blur}(u, v) = FFT2(i_{blur}(x, y)) \qquad (9)$$

In step S704, the corrected image generation unit 111 performs deconvolution processing using the 2D Fourier transform result $I_{blur}$ and correction coefficient sequence W by solving equation (10):

$$I(u, v) = \frac{aT}{W(u, v)} I_{blur}(u, v) \qquad (10)$$

where a is the blur speed of the image capturing device that is the magnitude of a blur vector indicated by blur information, and T is the exposure time acquired from the exposure control unit 116. I(u, v) is the 2D Fourier transform result of a blur-free image i(x, y) and is defined by equation (11):

$$I(u, v) = FFT2(i(x, y)) \qquad (11)$$

In step S705, the corrected image generation unit 111 performs a 2D inverse Fourier transform for the result I(u, v) of the deconvolution processing in step S704 by solving equation (12):

$$i(x, y) = IFFT2(I(u, v)) \qquad (12)$$

where IFFT2( ) is the function of inversely transforming FFT2( ). In step S706, the corrected image generation unit 111 sends the image i(x, y) as the result of the inverse Fourier transform in step S705 as a blur-corrected image (output image) to the image display unit 114 and image recording unit 115 via the output terminal 113.

In the first embodiment, deconvolution based on division in the frequency space is executed as indicated by equation (10), but another deconvolution may be executed instead. For example, the Lucy-Richardson algorithm, an algorithm using a Wiener filter, an algorithm using a regularization filter, or the like is also available. Further, filtering processing in a real space may replace deconvolution processing in the frequency space.

Figure 8A:
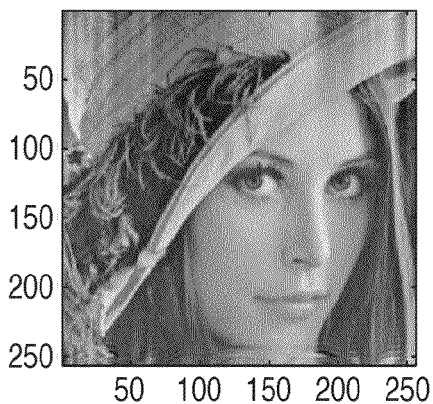
FIGS. 8A to 8C are views each showing a blur-corrected image.
Figure 8B:
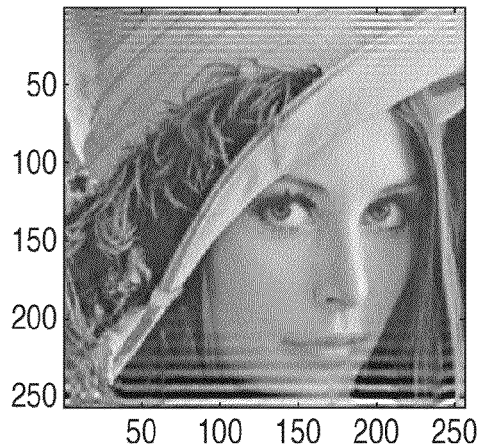

FIG. 8A shows a blur-corrected image i(x, y) having undergone correction processing using images which are weighted and added in accordance with the weighting coefficient sequence w. FIG. 8B shows a blur-corrected image i2(x, y) having undergone correction processing using images which are weighted and synthesized using the weighting coefficient sequence w2. As shown in FIG. 8B, image degradation occurs at the upper and lower ends of the image i2(x, y). In contrast, as shown in FIG. 8A, image degradation generated in the image i2(x, y) can be suppressed in the image i(x, y). This means that image degradation is relaxed successfully by performing blur correction for successively captured image data using images multiplied by weighting coefficients of real number values.

<Weighting Coefficient Sequence>

The weighting coefficient sequence stored in the weighting coefficient sequence DB 108 will be explained. The weighting coefficient sequence is generated (defined) by the weighting coefficient sequence defining unit 112 and stored in the weighting coefficient sequence DB 108. The above-described blur correction processing is executed after the weighting coefficient sequence generated by the weighting coefficient sequence defining unit 112 is stored in the weighting coefficient sequence DB 108.

Figure 6:
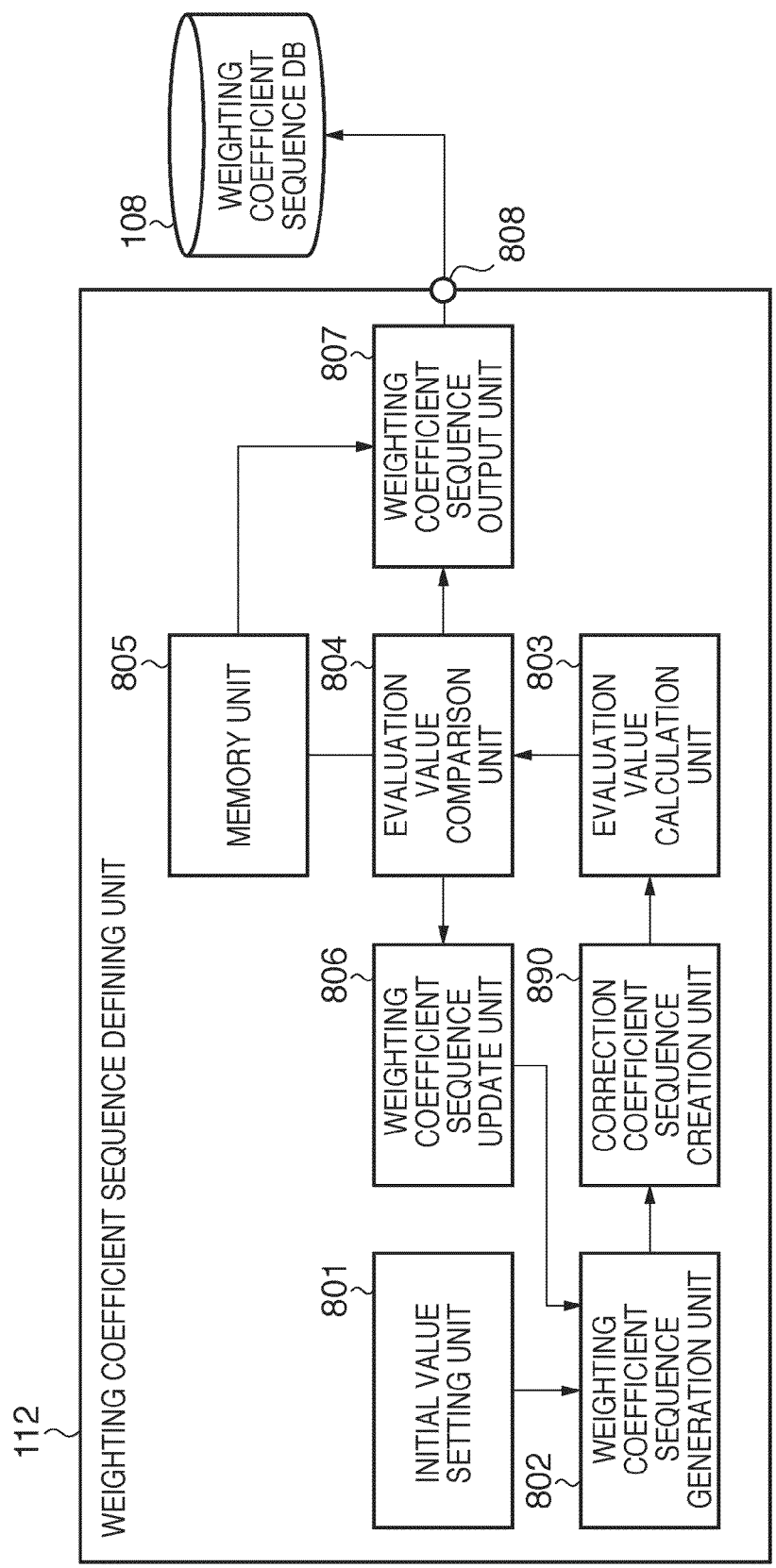
FIG. 6 is a block diagram exemplifying the functional arrangement of a weighting coefficient sequence defining unit 112.

The functional arrangement of the weighting coefficient sequence defining unit 112 will be exemplified with reference to the block diagram of FIG. 6. An initial value setting unit 801 sets an element count L for the weighting coefficient sequence w. In the example of equation (5), L=15 is set.

A weighting coefficient sequence generation unit 802 sets the initial value of each weighting coefficient w(l) in the weighting coefficient sequence w having the element count L. Although the initial value setting method is not particularly limited, for example, a pseudorandom number is used. In this case, pseudorandom numbers generate real number values exhibiting a standard deviation of 1 in accordance with the normal distribution.

A correction coefficient sequence creation unit 890 creates the array w' by executing the same processing as that of the correction coefficient sequence creation unit 109 using L pieces of blur information obtained in advance by any method, and the weighting coefficient sequence w determined by the weighting coefficient sequence generation unit 802. The "L pieces of blur information obtained in advance by any method" are, for example, L pieces of blur information obtained in advance by the blur detection unit 102 when L captured images were obtained. Needless to say, they may be L pieces of blur information generated in advance by any method. Further, the correction coefficient sequence creation unit 890 performs a 2D Fourier transform for the array w' to generate the 2D Fourier transform result W of the array w' by performing calculation processing according to the above equation (7).

An evaluation value calculation unit 803 calculates the evaluation value of the 2D Fourier transform result W created by the correction coefficient sequence creation unit 890. An evaluation value comparison unit 804 evaluates the evaluation value. If the evaluation value is smaller than the evaluation criterion, the evaluation value comparison unit 804 instructs a weighting coefficient sequence update unit 806 to update the weighting coefficient sequence w in order to generate the 2D Fourier transform result W again. Upon receiving the instruction, the weighting coefficient sequence update unit 806 instructs the weighting coefficient sequence generation unit 802 to generate a new pseudorandom number. If the evaluation value is equal to or larger than the evaluation criterion, the evaluation value comparison unit 804 stores, in a memory unit 805, a weighting coefficient sequence w (weighting coefficient sequence generated by the weighting coefficient sequence generation unit 802) used to generate the 2D Fourier transform result W whose evaluation value has been calculated.

Upon completion of evaluation by the evaluation value comparison unit 804, a weighting coefficient sequence output unit 807 reads out the weighting coefficient sequence w stored in the memory unit 805, and stores it in the weighting coefficient sequence DB 108 via an output terminal 808.

Processing performed by the weighting coefficient sequence defining unit 112 will be explained with reference to FIG. 7 which is a flowchart showing this processing. In step S901, the initial value setting unit 801 determines the element count L of the weighting coefficient sequence w. In step S902, the weighting coefficient sequence generation unit 802 sets the initial value of each weighting coefficient w(l) in the weighting coefficient sequence w having the element count L.

In step S903, the correction coefficient sequence creation unit 890 creates the array w' using L pieces of blur information and the weighting coefficient sequence w determined by the weighting coefficient sequence generation unit 802. The correction coefficient sequence creation unit 890 performs a 2D Fourier transform for the array w' to generate the 2D Fourier transform result W of the array w' by performing calculation processing in accordance with the above equation (7).

In step S904, the evaluation value calculation unit 803 calculates the evaluation value Eval of the 2D Fourier transform result W created by the correction coefficient sequence creation unit 890 by solving equation (13):

$$Eval = \sum_{u=0}^{1} \sum_{v=0}^{1} \|W(u, v)\| \qquad (13)$$

Equation (13) Fourier-transforms the weighting coefficient sequence and calculates the integral value of the power as the evaluation value Eval.

In step S905, the evaluation value comparison unit 804 compares the evaluation value Eval with a threshold Eval0 (0 in the initial state). If Eval>Eval0 as a result of the comparison, the process advances to step S907; if Eval≤Eval0, to step S906.

In step S906, the evaluation value comparison unit 804 instructs the weighting coefficient sequence update unit 806 to update the weighting coefficient sequence w. The weighting coefficient sequence update unit 806 instructs the weighting coefficient sequence generation unit 802 to generate a new pseudorandom number. In response to this, the weighting coefficient sequence generation unit 802 creates a new weighting coefficient sequence w using a new pseudorandom number. The processes in step S903 and subsequent steps are repeated using the new weighting coefficient sequence w.

In step S907, the evaluation value comparison unit 804 stores, in the memory unit 805, the weighting coefficient sequence w used when the 2D Fourier transform result W was generated in step S903. If the weighting coefficient sequence w has already been stored in the memory unit 805, it is overwritten. Further in step S907, the evaluation value comparison unit 804 updates the value Eval0 to the value Eval.

In step S908, the evaluation value comparison unit 804 determines whether the processes in steps S903 to S907 have been done by a predetermined number of times. If the evaluation value comparison unit 804 determines that these processes have been done by a predetermined number of times (YES in step S908), the process advances to step S909; if NO, returns to step S906. In step S909, the weighting coefficient sequence output unit 807 reads out the weighting coefficient sequence w stored in the memory unit 805, and stores it in the weighting coefficient sequence DB 108 via the output terminal 808.

In the above description, the result of solving equation (13) is used as the evaluation value Eval, but the result of solving another equation may be used as the evaluation value Eval. For example, a value Eval2 calculated in accordance with equation (14) may replace the evaluation value Eval:

$$Eval2 = \frac{1}{\sum_{u=0}^{1} \sum_{v=0}^{1} (\|W(u, v)/W(0, 0)\| - 1)^2} \qquad (14)$$

Figure 8C:
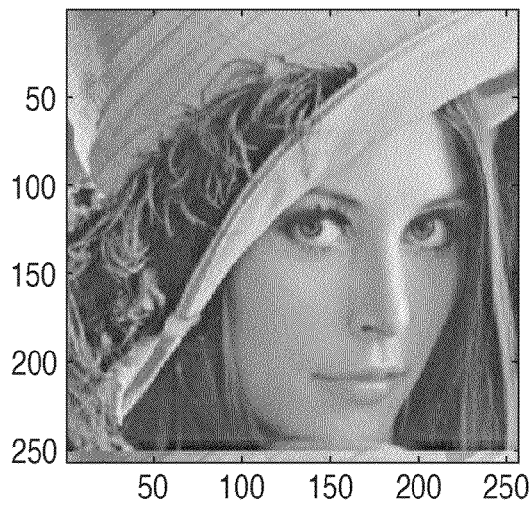

Eval2 is obtained from the equation which provides a higher evaluation value for a weighting coefficient sequence with which most of all the values of the correction coefficient sequence become 1. That is, Eval2 is an evaluation value which defines the response values of the 2D Fourier transform result W at respective frequencies to be smaller. In FIG. 4B, the solid line exemplifies a correction coefficient sequence which maximizes the value Eval2 calculated from equation (14). Similar to FIG. 4A, the correction coefficient sequence is represented one-dimensionally. The abscissa indicates the frequency u, and positive frequencies within the range of 0≤u≤1 are plotted. The ordinate indicates the logarithm of a response value at each frequency, and each response value is normalized by the value of the DC component (u=0). In FIG. 4B, the solid line indicates the frequency response value of the weighting coefficient sequence which maximizes the value Eval2 calculated from equation (14). This reveals that a response value of almost 1 is obtained at all frequencies. At the frequency response value of almost 1, image degradation generated in blur correction according to equation (3) can be suppressed (FIG. 8C). In FIGS. 4A and 4B, the dotted line indicates a frequency response value derived from a weighting coefficient sequence set by equation (8).

By changing the value of the weighting coefficient sequence in this manner, the image degradation state can be changed to provide an image which matches the user taste. In update of the weighting coefficient sequence in step S906, a pseudorandom number is generated to update the weighting coefficient sequence. However, the weighting coefficient sequence may be updated using another method. For example, a desired weighting coefficient sequence may be obtained by an optimization method such as a genetic algorithm.

In step S906, a plurality of weighting coefficient sequences prepared in advance may be selected one by one. In this case, it is determined in step S908 whether the processes in steps S903 to S907 have been done by the number of weighting coefficient sequences prepared in advance. In this case, a blur-corrected image generated as an output image serves as an image generated using a weighting coefficient sequence exhibiting the highest correction effect (largest evaluation value) among the plurality of weighting coefficient sequences prepared in advance.

Note that the first embodiment has explained deconvolution processing for a captured image containing a vertical blur, but a blur capable of deconvolution is not limited to the vertical blur. In other words, blur correction is possible by deconvolution processing even for a captured image containing a horizontal or oblique blur other than the vertical blur.

Blur information of the image capturing device in the first embodiment may be one detected by a gyro sensor. It is also possible to derive the relative moving amounts between a plurality of captured images by calculating the correlation values between the images, and use these moving amount as pieces of blur information.

In the above description, L is set, and then a weighting coefficient sequence w having the element count L is generated. However, it is also possible to create in advance weighting coefficient sequences w having various element counts L, register them in the weighting coefficient sequence DB 108, and use a weighting coefficient sequence w corresponding to the number of input captured images in the weighting unit 107 and correction coefficient sequence creation unit 109.

Although various modifications to the first embodiment are conceivable, the gist of this embodiment is as follows. First, an array is generated, in which L (L>1) weighting coefficients by which L captured images obtained by the image capturing device are to be multiplied are held at positions defined by the directional components of blur vectors of the image capturing device when these captured images were obtained. The L weighting coefficients are adjusted to increase the sum of the frequency components of the generated array or reduce variations of the frequency components.

Then, L captured images obtained by the image capturing device after the adjustment are acquired (first acquisition). For each acquired captured image, the blur vector of the image capturing device when this captured image was obtained is acquired (second acquisition).

The respective captured images acquired in the first acquisition are multiplied by corresponding ones of the L weighting coefficients, generating L weighted captured images. The L generated weighted captured images are synthesized, generating one synthesized image.

Then, an array is generated, in which the L weighting coefficients are held at positions defined by the directional components of the blur vectors acquired in the second acquisition for the captured images multiplied by the weighting coefficients (array generation).

Deconvolution processing is executed using the frequency component of the generated array and that of the synthesized image. The deconvolution processing result undergoes an inverse frequency transform, generating one output image (image generation).

As described above, the first embodiment can suppress image degradation when generating one image from captured images obtained by time-division exposure. In addition, the first embodiment which achieves blur correction or blur modification/removal using all input captured images can cancel random noise generated in image capturing.

[Second Embodiment]

The first embodiment performs blur correction using a weighting coefficient sequence w generated in advance. In the second embodiment, a weighting coefficient sequence w which gives higher image quality is obtained, and a higher-quality image is generated using the obtained weighting coefficient sequence w. Even an image processing apparatus according to the second embodiment will be explained as an image capturing device such as a digital camera.

<Example of Functional Arrangement of Image Processing Apparatus>

Figure 9:
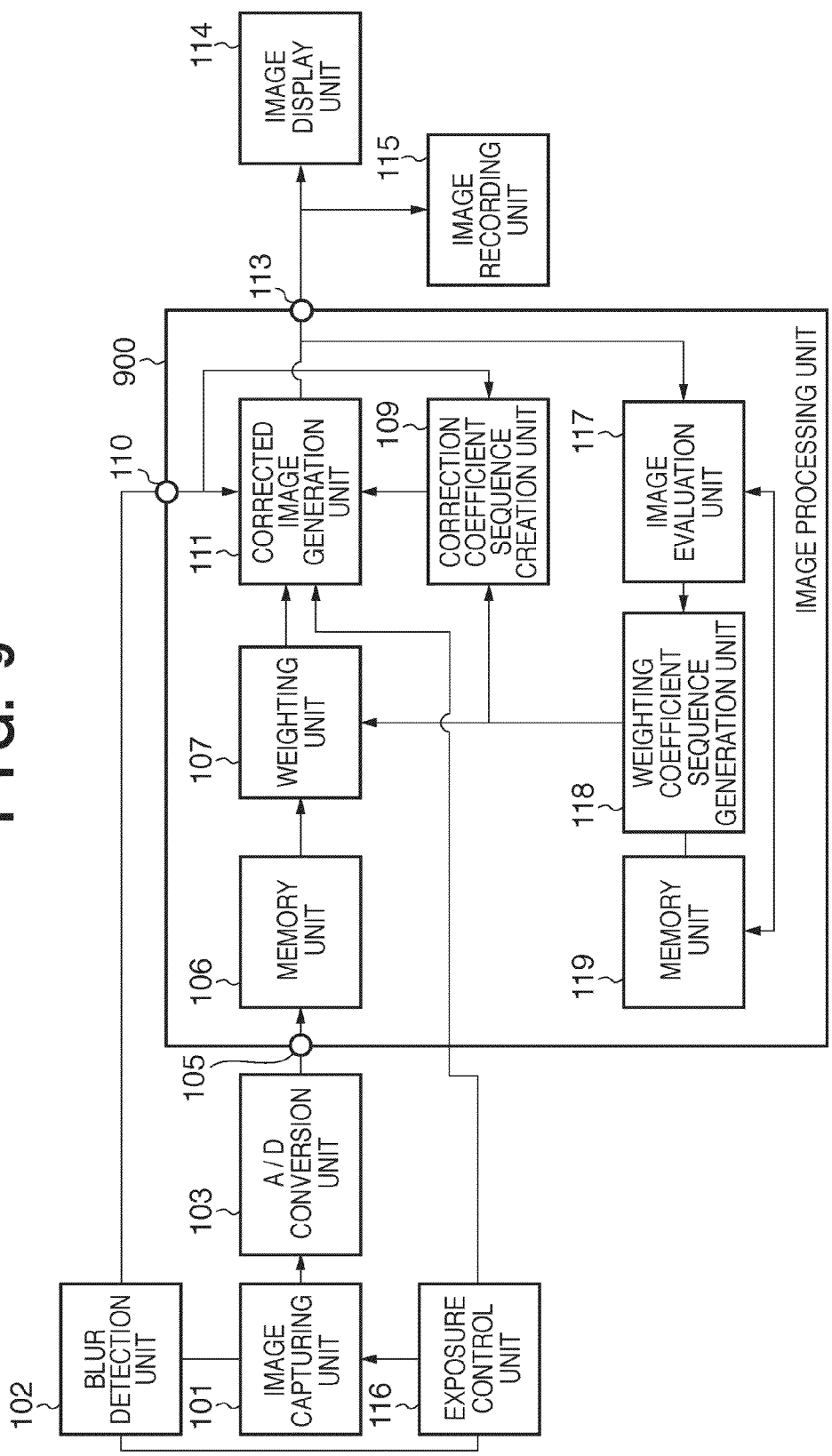
FIG. 9 is a block diagram exemplifying the functional arrangement of an image processing apparatus.

The functional arrangement of the image processing apparatus according to the second embodiment will be exemplified with reference to the block diagram of FIG. 9. In the arrangement shown in FIG. 9, an image processing unit 900 is configured by adding an image evaluation unit 117, weighting coefficient sequence generation unit 118, and memory unit 119 to an image processing unit 104 shown in FIG. 1A, and omitting the weighting coefficient sequence DB 108 and weighting coefficient sequence defining unit 112. The remaining building components are the same as those in the first embodiment, and a description thereof will not be repeated.

The image evaluation unit 117 evaluates the quality of an output image generated by a corrected image generation unit 111. The weighting coefficient sequence generation unit 118 generates a weighting coefficient sequence w used in a weighting unit 107 and correction coefficient sequence creation unit 109.

<Blur Correction according to Second Embodiment>

Figure 10:
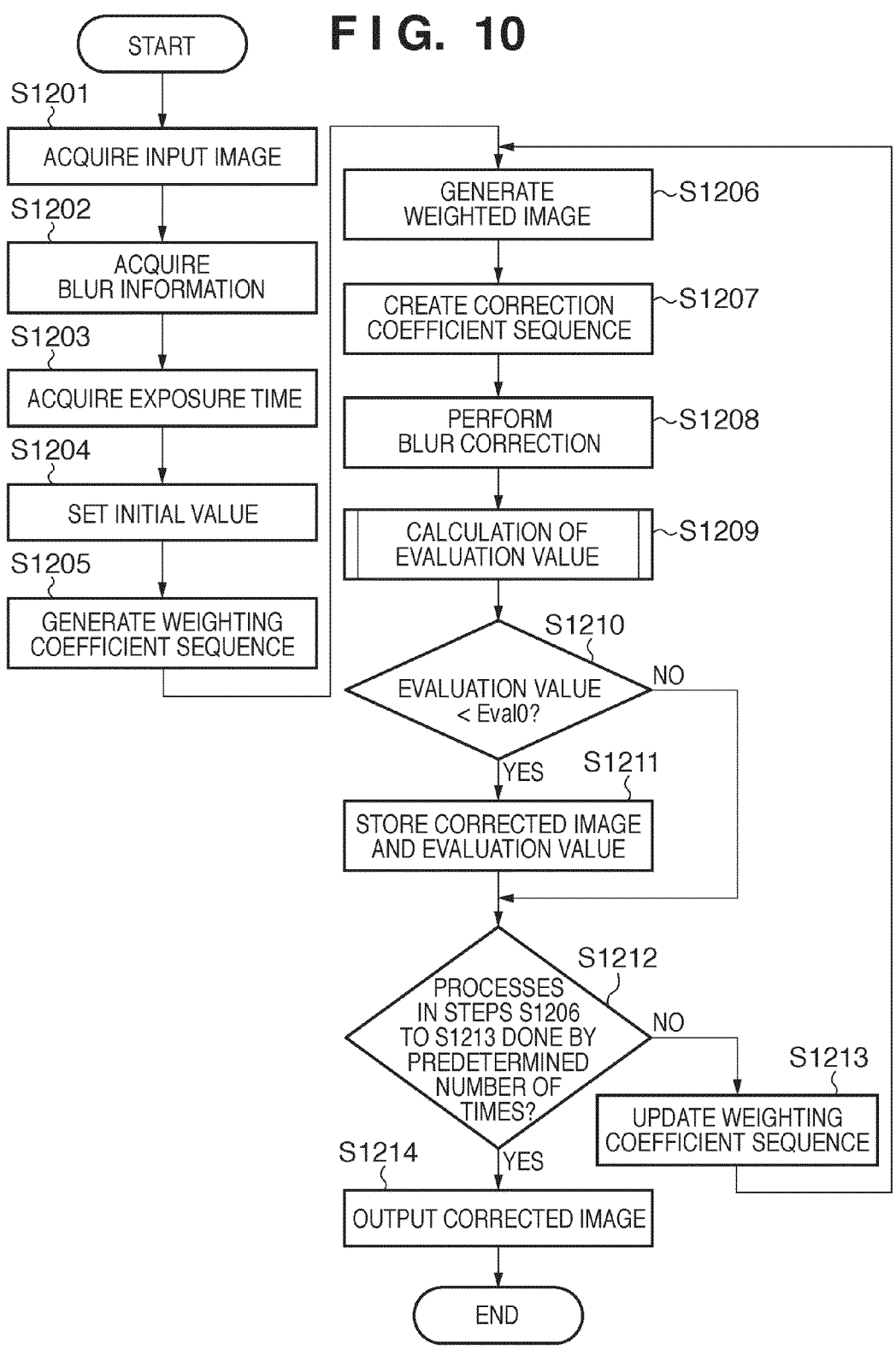
FIG. 10 is a flowchart showing processing performed by an image processing unit 900.

Processing performed by the image processing unit 900 will be explained with reference to FIG. 10 which is a flowchart showing this processing. The image processing unit 900 sequentially receives, via an input terminal 105, L (L>1) captured images obtained by performing time-division exposure by an image capturing unit 101. In step S1201, the image processing unit 900 stores the received captured images in a memory unit 106.

In step S1202, the corrected image generation unit 111 and correction coefficient sequence creation unit 109 acquire blur information input from a blur detection unit 102 via an input terminal 110. The blur information is formed from pieces of blur information detected by the blur detection unit 102 when the L respective captured images were obtained. In step S1203, the corrected image generation unit 111 acquires the exposure time T from an exposure control unit 116.

In step S1204, similar to step S901, the weighting coefficient sequence generation unit 118 determines the element count L of the weighting coefficient sequence w. In step S1205, similar to step S902, the weighting coefficient sequence generation unit 118 sets the initial value of each weighting coefficient w(l) in the weighting coefficient sequence w having the element count L. The weighting coefficient sequence w is expressed as [w(1), ..., w(L)].

In step S1206, the weighting unit 107 acquires the weighting coefficient sequence w from the weighting coefficient sequence generation unit 118. The weighting unit 107 multiplies the L respective captured images by corresponding weighting coefficients to generate L weighted captured images, and synthesizes the L generated weighted captured images to generate one synthesized image $i_{blur}$. The synthesized image is generated according to equation (4) similarly to the first embodiment.

In step S1207, by using the blur information acquired in step S1202 and the weighting coefficient sequence w acquired from the weighting coefficient sequence generation unit 118, the correction coefficient sequence creation unit 109 generates a correction coefficient sequence similarly to the first embodiment.

In step S1208, the corrected image generation unit 111 performs blur correction processing for the synthesized image $i_{blur}$ using the blur information acquired in step S1202, the exposure time T acquired in step S1203, and the correction coefficient sequence generated by the correction coefficient sequence creation unit 109. This blur correction processing is the same as that in the first embodiment. The corrected image generation unit 111 sends the blur-corrected image as an output image to the image evaluation unit 117.

In step S1209, the image evaluation unit 117 evaluates the quality of the output image received from the corrected image generation unit 111, obtaining an evaluation value Eval3. Processing of obtaining the evaluation value Eval3 will be described later.

In step S1210, the image evaluation unit 117 compares the evaluation value Eval3 with the threshold Eval0. As the initial value of the threshold Eval0, a sufficiently large value is set. For example, Eval0=1000 is set. If Eval3<Eval0 as a result of the comparison, the process advances to step S1211; if Eval3≥Eval0, to step S1212.

In step S1211, the image evaluation unit 117 stores, in the memory unit 119, the output image received from the corrected image generation unit 111. If the output image has already been stored in the memory unit 119, it is overwritten. Further, the image evaluation unit 117 updates the value Eval0 to the value Eval3.

In step S1212, the image evaluation unit 117 determines whether the processes in steps S1206 to S1213 have been done by a predetermined number of times. If the image evaluation unit 117 determines that these processes have been done by a predetermined number of times (YES in step S1212), the process advances to step S1214; if NO, advances to step S1213. In step S1214, the image evaluation unit 117 reads out the output image stored in the memory unit 119, and sends it to an image display unit 114 and image recording unit 115 via an output terminal 113.

In step S1213, the image evaluation unit 117 instructs the weighting coefficient sequence generation unit 118 to update the weighting coefficient sequence w. The weighting coefficient sequence generation unit 118 creates a new weighting coefficient sequence w using a new pseudorandom number. The new weighting coefficient sequence w is created similarly to the first embodiment. The processes in step S1206 and subsequent steps are repeated using the new weighting coefficient sequence w.

More specifically, in the above processing, every time the weighting coefficient sequence w is updated, an output image is generated using the updated weighting coefficient sequence w. If the generated output image is higher in quality than those generated before, this output image is set as an output candidate. An output image left as an output candidate after executing the update by a predetermined number of times is output as a final output image.

<Calculation Method of Evaluation Value Eval3>

Figure 11:
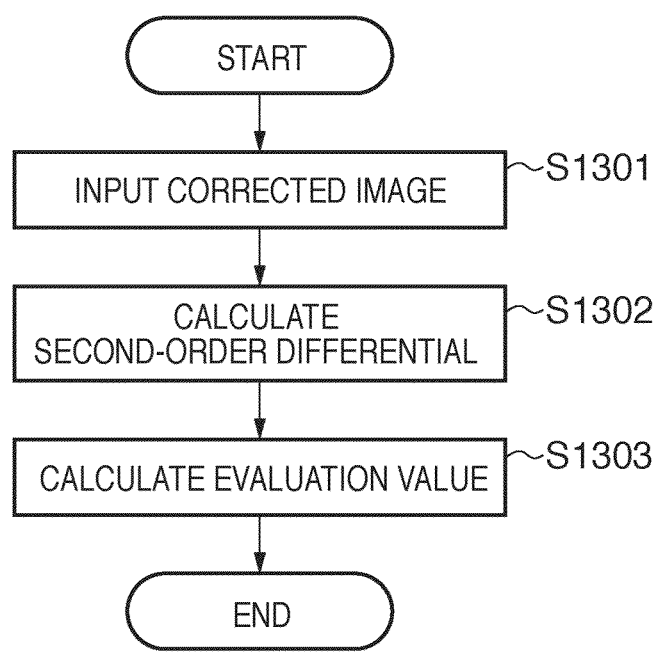
FIG. 11 is a flowchart showing details of processing in step S1209.

The processing in step S1209, that is, processing of obtaining the evaluation value Eval3 of the quality of an image output from the corrected image generation unit 111 will be explained with reference to FIG. 11 which is a flowchart showing this processing. Note that the second embodiment obtains an evaluation value for quantitatively evaluating the degree of correction of an output image. More specifically, the degree of wavy image distortion (called ringing) generated at the end of a generated image, as shown in FIGS. 8A to 8C, is evaluated quantitatively. Note that ringing occurs when a specific frequency is emphasized in image generation.

In step S1301, the image evaluation unit 117 acquires an output image (corrected image) sent from the corrected image generation unit 111. In step S1302, the image evaluation unit 117 calculates the second-order differential of the output image. The second-order differential calculation method is implemented by a convolution operation of applying a Laplacian filter to an output image. Equation (15) represents a convolution operation using a Laplacian filter f(i, j):

$$i_2(x, y) = \sum_{i=-1}^{1} \sum_{j=-1}^{1} i(x+i, y+j) f(i+1, j+1) \quad (15)$$

for (i, j)=(1, 1), f(i, j)=8
otherwise, f(i, j)=−1
where $i_2(x, y)$ is an image serving as the second-order differential of the output image. In step S1303, the image evaluation unit 117 calculates the evaluation value Eval3 for the output image using the second-order differential image $i_2(x, y)$. The evaluation value Eval3 is used as the standard deviation of the pixel values of the second-order differential image $i_2(x, y)$.

In an image shown in FIG. 8B, image degradation (ringing) appears at the upper and lower ends of the image. The evaluation value Eval3 tends to exhibit a relatively large value for such image degradation. While the standard deviation calculated for a less degraded image (FIG. 8A) is 28.2, the standard deviation calculated for a degraded image (FIG. 8B) is 55.9. In this way, the degree of blur correction can be evaluated based on the evaluation value Eval3.

Note that the second embodiment pays attention to the second-order differential of an output image, and derives the degree of ringing as an evaluation value. Alternatively, another evaluation value capable of evaluating ringing may be obtained. For example, it is also possible to analyze the frequency of an output image, extract a portion corresponding to ringing at which the frequency response value is relatively high, and handle the portion as a ringing evaluation value.

As described above, the second embodiment evaluates the degree of image degradation generated in an image having undergone blur correction or blur modification/removal. Therefore, the second embodiment can generate an output image in which an image-dependent degradation element out of image degradations generated after blur correction or blur modification/removal is suppressed.

[Third Embodiment]

The first and second embodiments perform blur correction using images obtained by multiplying, by weighting coefficients, respective captured images successively obtained by time-division exposure. The third embodiment executes blur correction using images optically weighted in the time direction by controlling the quantity of light incident on the image sensor of the image capturing device. Even an image processing apparatus according to the third embodiment will be explained as an image capturing device such as a digital camera.

<Example of Functional Arrangement of Image Processing Apparatus>

Figure 12A:
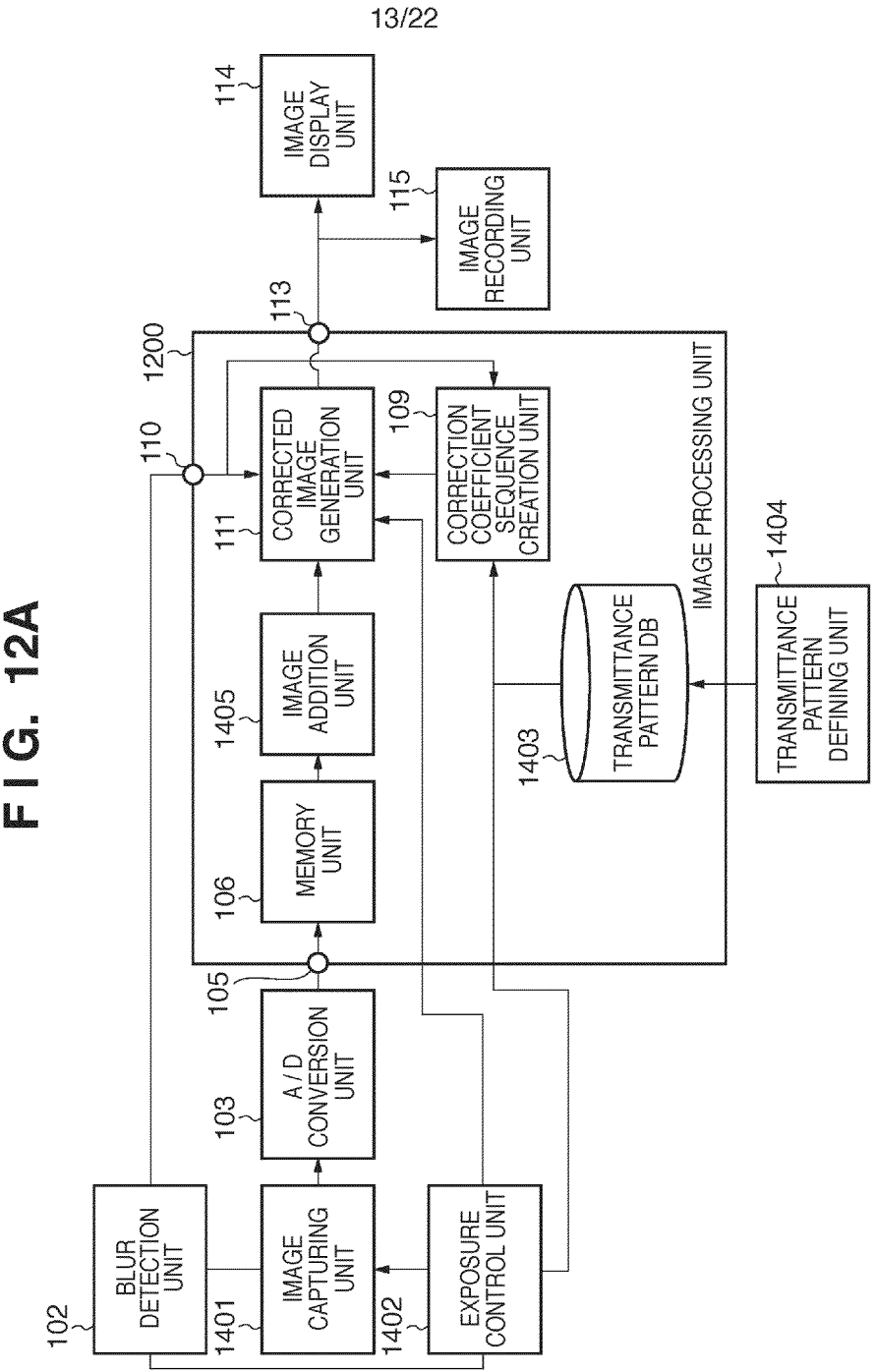
FIG. 12A is a block diagram exemplifying the functional arrangement of an image processing apparatus.

The functional arrangement of the image processing apparatus according to the third embodiment will be exemplified with reference to the block diagram of FIG. 12A.

An image capturing unit 1401 includes an image capturing unit 101 in the first embodiment, and in addition, a variable transmittance filter for controlling the incident light quantity in image capturing. An exposure control unit 1402 for controlling exposure controls opening/closing of the shutter of the image capturing unit 1401 and the transmittance of the variable transmittance filter.

A transmittance pattern DB 1403 stores a transmittance pattern indicating the transition of the transmittance of the variable transmittance filter. The transmittance pattern is generated by a transmittance pattern defining unit 1404 and stored in the transmittance pattern DB 1403. An image addition unit 1405 synthesizes (adds) L captured images read out from a memory unit 106, generating one synthesized image. A correction coefficient sequence creation unit 109 and corrected image generation unit 111 operate to correct the blur of the synthesized image using the transmittance pattern instead of the weighting coefficient sequence w.

Figure 12B:
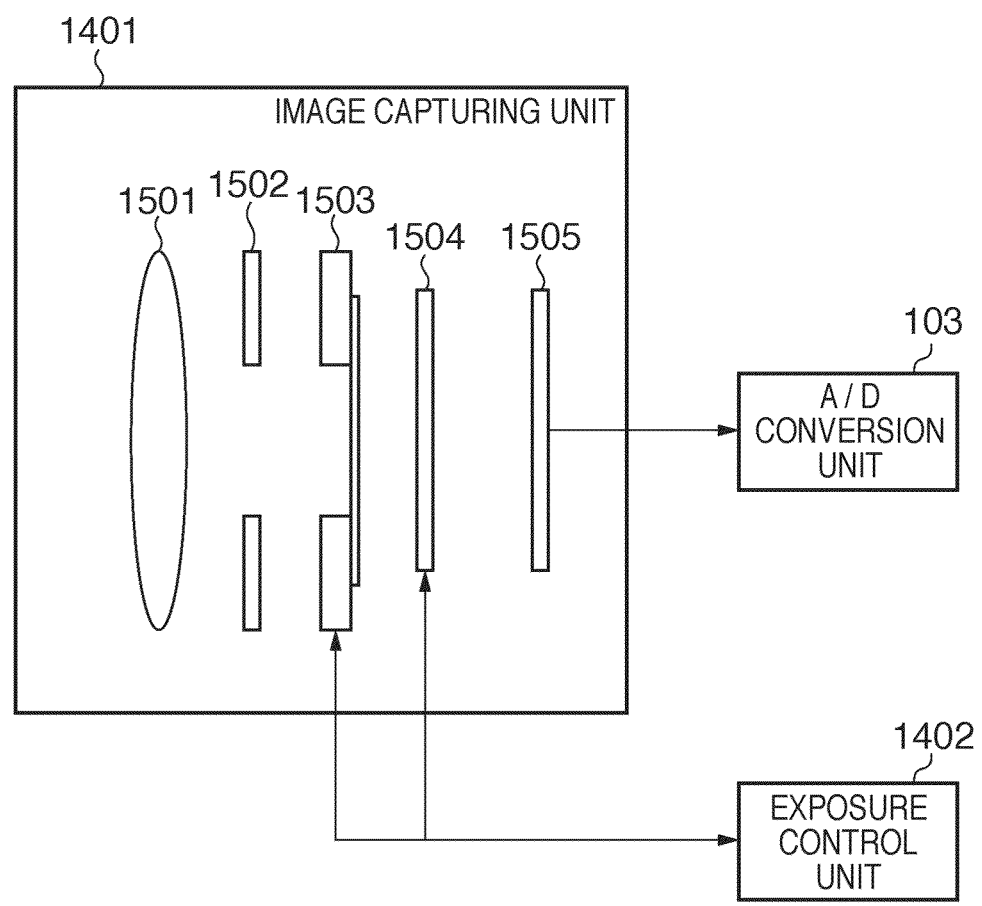
FIG. 12B is a view exemplifying the arrangement of an image capturing unit 1401.

FIG. 12B exemplifies the arrangement of the image capturing unit 1401. The image capturing unit 1401 includes an imaging lens 1501, a stop 1502, a shutter 1503, a filter 1504 whose transmittance is variable, and an image sensor 1505.

The exposure control unit 1402 controls the shutter 1503 and filter 1504 to open/close the shutter and change the filter transmittance during capturing. In synchronization with the filter 1504, the shutter 1503 transmits light traveling from an object, and allows the light to enter the image sensor 1505 or shields it. The shutter 1503 can be, for example, a mechanical focal-plane shutter. The filter 1504 changes the filter transmittance in a period (image capturing period) during which the shutter 1503 transmits light traveling from an object. In the third embodiment, the filter 1504 adjusts the quantity of light incident on the image sensor 1505 by absorbing, at an arbitrary timing, light of the projected image of an object that is obtained via the imaging lens 1501. The exposure control unit 1402 controls the timing when the transmittance of the filter 1504 is changed. The filter 1504 can be, for example, a liquid crystal filter. In the third embodiment, a plurality of captured images are obtained using the image capturing unit 1401 by time-division exposure similarly to the first and second embodiments. At this time, the exposure period and the period during which the filter 1504 maintains a constant transmittance for the captured image are synchronized with each other for each captured image. More specifically, during the exposure period for obtaining a captured image x, the filter 1504 operates to maintain a transmittance set in advance for the captured image x. This transmittance is a transmittance x corresponding to the captured image x among transmittances in the transmittance pattern.

Figure 14A:
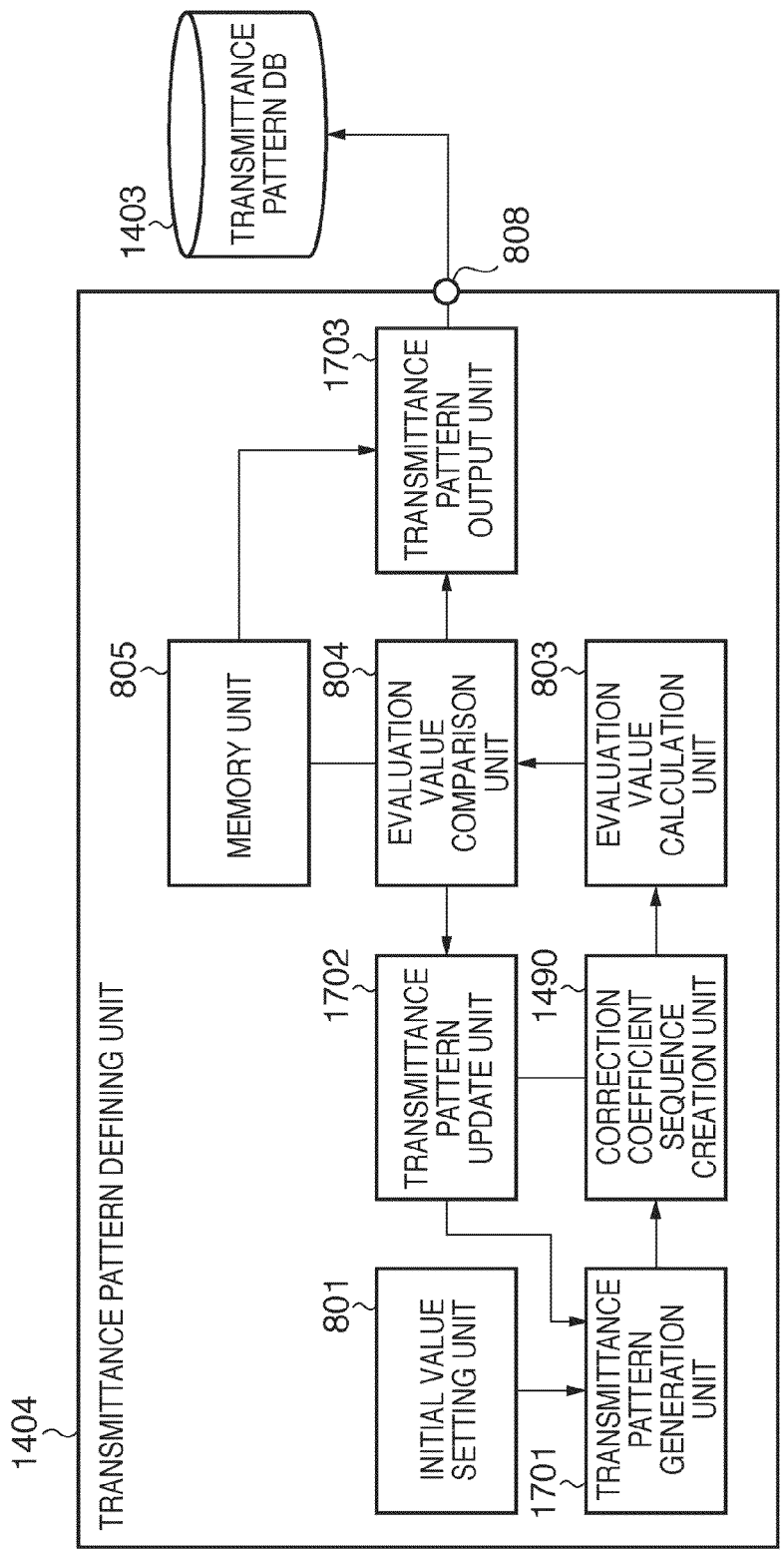
FIG. 14A is a block diagram exemplifying the functional arrangement of a transmittance pattern defining unit 1404.
Figure 14B:
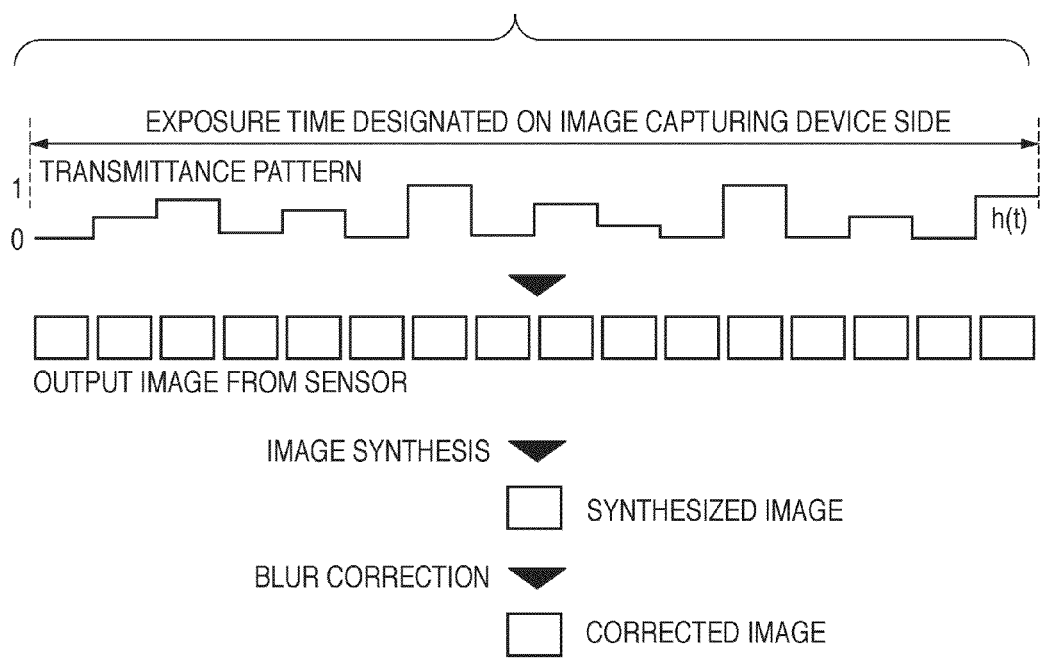
FIG. 14B is a view showing the operation of whole blur correction.

FIG. 14B shows the operation of whole blur correction according to the third embodiment. Each captured image acquired by time-division exposure and the filter transmittance correspond to each other. The filter transmittance does not change when each image is acquired. The first embodiment executes blur correction using images weighted by multiplying them by weighting coefficients. In contrast, the third embodiment optically weights each captured image by controlling the transmittance of the filter 1504.

<Blur Correction according to Third Embodiment>

Processing performed by the image capturing unit 1401 and an image processing unit 1200 will be explained with reference to FIG. 13 which is a flowchart showing this processing. In step S1601, the image capturing unit 1401 initializes the image sensor 1505 by reading out all light detection states left in the image sensor 1505 within the image capturing unit 1401.

In step S1602, the exposure control unit 1402 starts operating the shutter 1503 within the image capturing unit 1401 to set it in the exposure state. Also, the exposure control unit 1402 controls the transmittance of the filter 1504. Upon completion of controlling the filter 1504, the exposure control unit 1402 starts operating the shutter 1503 again to set it in the light-shielding state. That is, the exposure control unit 1402 makes preparations for an image to be captured first.

The transmittance of the filter 1504 is changed for each captured image in accordance with a transmittance pattern referred to by the exposure control unit 1402 (the transmittance does not change when it is constant between successively captured images). As described with reference to FIG. 14B, a plurality of captured images are obtained using time-division exposure in the third embodiment. The acquisition timing of each image and the timing when the transmittance of the filter 1504 is changed are synchronized with each other. The transmittance pattern is created in advance by the transmittance pattern defining unit 1404 and stored in the transmittance pattern DB 1403. The operation of the transmittance pattern defining unit 1404 will be described later.

The image processing unit 1200 sequentially receives, via an input terminal 105, L captured images obtained by performing time-division exposure by the image capturing unit 1401. As described above, each captured image is obtained at a corresponding transmittance. In principle, the captured image has been multiplied by an optical weighting coefficient at this time. Since the captured image is formed from incident light having passed through the filter 1504, the brightness of the captured image is correlated with a filter transmittance used when the captured image was obtained.

In step S1603, the image processing unit 1200 stores the input captured images in the memory unit 106. In step S1604, the image addition unit 1405 reads out L captured images from the memory unit 106, and synthesizes the L readout captured images, generating one synthesized image $i_{blur}$.

A pixel value at the pixel position (x, y) in one synthesized image $i_{blur}$ is calculated in accordance with equation (16):

$$i_{blur}(x, y) = \sum_{l=1}^{L} i_{filter}(x, y; l) \quad (16)$$

where $i_{filter}(x, y; l)$ is the pixel value at the pixel position (x, y) in the lth acquired captured image out of a plurality of captured images. By executing calculation based on equation (16) for each pixel position, one synthesized image $i_{blur}$ can be generated.

The third embodiment controls the quantity of incident light passing through the filter 1504 in image capturing. Thus, weighting addition processing as described in the first and second embodiments is unnecessary, and simple addition processing suffices. The third embodiment can therefore reduce the circuit scale of the image processing unit necessary for blur correction.

In step S1605, by using blur information received from a blur detection unit 102 via an input terminal 110, and the transmittance pattern read out from the transmittance pattern DB 1403, the correction coefficient sequence creation unit 109 generates a correction coefficient sequence used for blur correction by the corrected image generation unit 111. Details of the processing in step S1605 will be described later.

In step S1606, the corrected image generation unit 111 acquires the blur information input from the blur detection unit 102 via the input terminal 110. In step S1607, the corrected image generation unit 111 acquires the exposure time T from an exposure control unit 116.

In step S1608, the corrected image generation unit 111 performs blur correction processing for the synthesized image $i_{blur}$ using the blur information acquired in step S1606, the exposure time T acquired in step S1607, and the correction coefficient sequence generated by the correction coefficient sequence creation unit 109. The blur correction processing is executed similarly to the first embodiment. Then, the corrected image generation unit 111 sends the blur-corrected image as an output image to an image display unit 114 and image recording unit 115 via an output terminal 113.

<Creation of Correction Coefficient Sequence>

The first embodiment uses the weighting coefficient sequence w to create the correction coefficient sequence. The third embodiment uses the transmittance pattern in place of the weighting coefficient sequence w. More specifically, the transmittance is stored instead of storing a weighting coefficient at a position indicated by the blur vector component. The remaining processing is the same as that in the first embodiment.

<Transmittance Pattern>

The functional arrangement of the transmittance pattern defining unit 1404 will be explained with reference to the block diagram of FIG. 14A. An initial value setting unit 801 sets an element count L for the transmittance pattern. A transmittance pattern generation unit 1701 sets the initial value of each transmittance in the transmittance pattern having the element count L. The initial value setting method is not particularly limited. However, the transmittance value changes within the range of 0 to 1, so a value with which a pseudorandom number is generated within the range of 0 to 1 is set as the transmittance. This is premised on that the transmittance of the filter 1504 can be controlled with the same precision as the number of significant digits of a value generated using a pseudorandom number. In this case, the number of significant digits is set to two, and a pseudorandom number is generated within the range of 0 to 1.

A correction coefficient sequence creation unit 1490 creates the array w' by executing the same processing as that of the correction coefficient sequence creation unit 109 using L pieces of blur information obtained in advance by any method, and the transmittance pattern determined by the transmittance pattern generation unit 1701. Further, the correction coefficient sequence creation unit 1490 performs a 2D Fourier transform for the array w' to generate the 2D Fourier transform result W of the array w' by performing calculation processing according to the above equation (7).

An evaluation value calculation unit 803 calculates the evaluation value of the 2D Fourier transform result W created by the correction coefficient sequence creation unit 1490. An evaluation value comparison unit 804 evaluates the evaluation value similarly to the first embodiment. If the evaluation value is smaller than the evaluation criterion, the evaluation value comparison unit 804 instructs a transmittance pattern update unit 1702 to update the transmittance pattern in order to generate the 2D Fourier transform result W again. Upon receiving the instruction, the transmittance pattern update unit 1702 instructs the transmittance pattern generation unit 1701 to generate a new pseudorandom number. If the evaluation value is equal to or larger than the evaluation criterion, the evaluation value comparison unit 804 stores, in a memory unit 805, a transmittance pattern (transmittance pattern generated by the transmittance pattern generation unit 1701) used when the current 2D Fourier transform result W was generated.

Upon completion of evaluation by the evaluation value comparison unit 804, a transmittance pattern output unit 1703 reads out the transmittance pattern stored in the memory unit 805, and stores it in the transmittance pattern DB 1403 via an output terminal 808. That is, the operation of the transmittance pattern defining unit 1404 is basically the same as the operation according to the flowchart of FIG. 7 except that the transmittance pattern replaces the weighting coefficient sequence w.

Although various modifications to the third embodiment are conceivable, the gist of the third embodiment is as follows. First, an array is generated, in which transmittances set to obtain L (L>1) captured images by the image capturing device for light to the image sensor of the image capturing device are held at positions defined by the directional components of blur vectors of the image capturing device when these captured images were obtained. The transmittances are then adjusted to increase the sum of the frequency components of the generated array or reduce variations of the frequency components.

Then, L captured images obtained by the image capturing device after the adjustment are acquired (first acquisition). For each acquired captured image, the blur vector of the image capturing device when this captured image was obtained is acquired (second acquisition).

The respective captured images acquired in the first acquisition are synthesized, generating one synthesized image. An array is generated, in which the transmittances are held at positions defined by the directional components of the blur vectors acquired in the second acquisition for the captured images obtained at the transmittances (array generation). Deconvolution processing is executed using the frequency component of the generated array and that of the synthesized image. The deconvolution processing result undergoes an inverse frequency transform, generating one output image (image generation).

As described above, the third embodiment can execute blur correction or blur modification/removal using a plurality of captured images optically weighted by performing image capturing while changing the transmittance of the variable transmittance filter. Thus, the third embodiment can reduce the circuit scale of the image processing unit necessary for blur correction or blur modification/removal.

[Fourth Embodiment]

The third embodiment acquires a plurality of optically weighted captured images by controlling the transmittance of the variable transmittance filter in synchronization with time-division exposure. The fourth embodiment corrects a blur without image capturing by time-division exposure. Even an image processing apparatus according to the fourth embodiment will be explained as an image capturing device such as a digital camera.

Figure 15A:
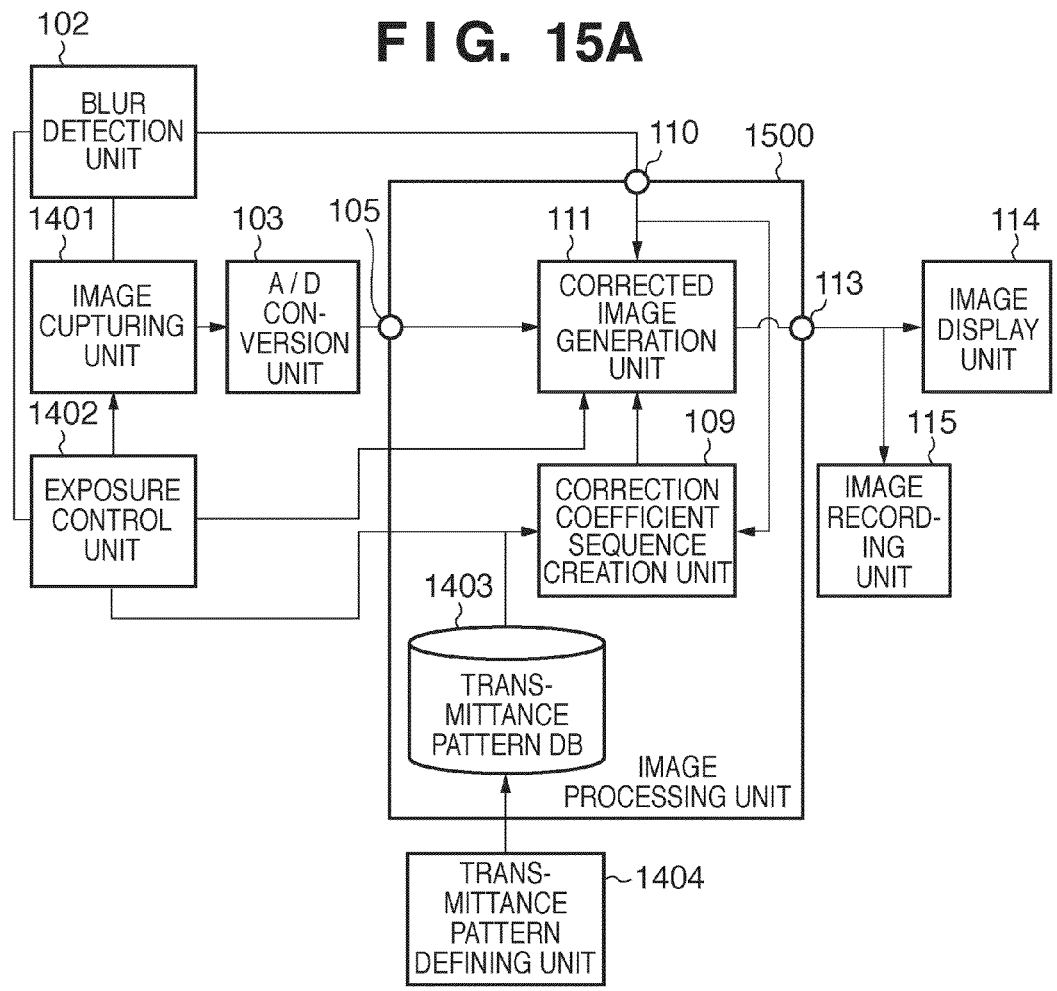
FIG. 15A is a block diagram exemplifying the functional arrangement of an image processing apparatus.

The functional arrangement of the image processing apparatus according to the fourth embodiment will be exemplified with reference to the block diagram of FIG. 15A. The arrangement shown in FIG. 15A is configured by omitting the memory unit 106 and image addition unit 1405 from the arrangement of FIG. 12A.

Figure 15B:
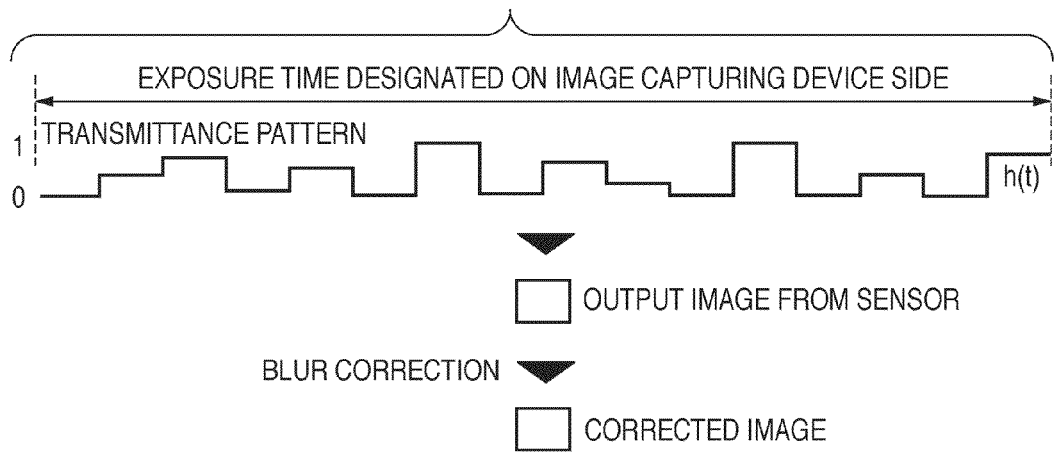
FIG. 15B is a view showing the operation of whole blur correction.

In the fourth embodiment, an image capturing unit 1401 captures one image while changing the transmittance. This image is input as a captured image to an image processing unit 1500 via an input terminal 105. For this captured image, a corrected image generation unit 111 and correction coefficient sequence creation unit 109 execute an operation corresponding to the number of images=1, generating one output image (FIG. 15B).

FIG. 16 is a flowchart showing processing performed by the image processing unit 1500. In this flowchart, step S1604 is omitted from the flowchart of FIG. 13.

As described above, the fourth embodiment can perform blur correction or blur modification/removal for a captured image without image capturing by time-division exposure, and can omit a memory for temporarily holding captured images.

[Fifth Embodiment]

In the first embodiment, the weighting coefficient sequence w is defined in advance by the weighting coefficient sequence defining unit 112, and stored in the weighting coefficient sequence DB 108. In the fifth embodiment, the weighting coefficient sequence w is analytically obtained in accordance with the number L of captured images.

<Example of Functional Arrangement of Image Processing Apparatus>

Figure 17:
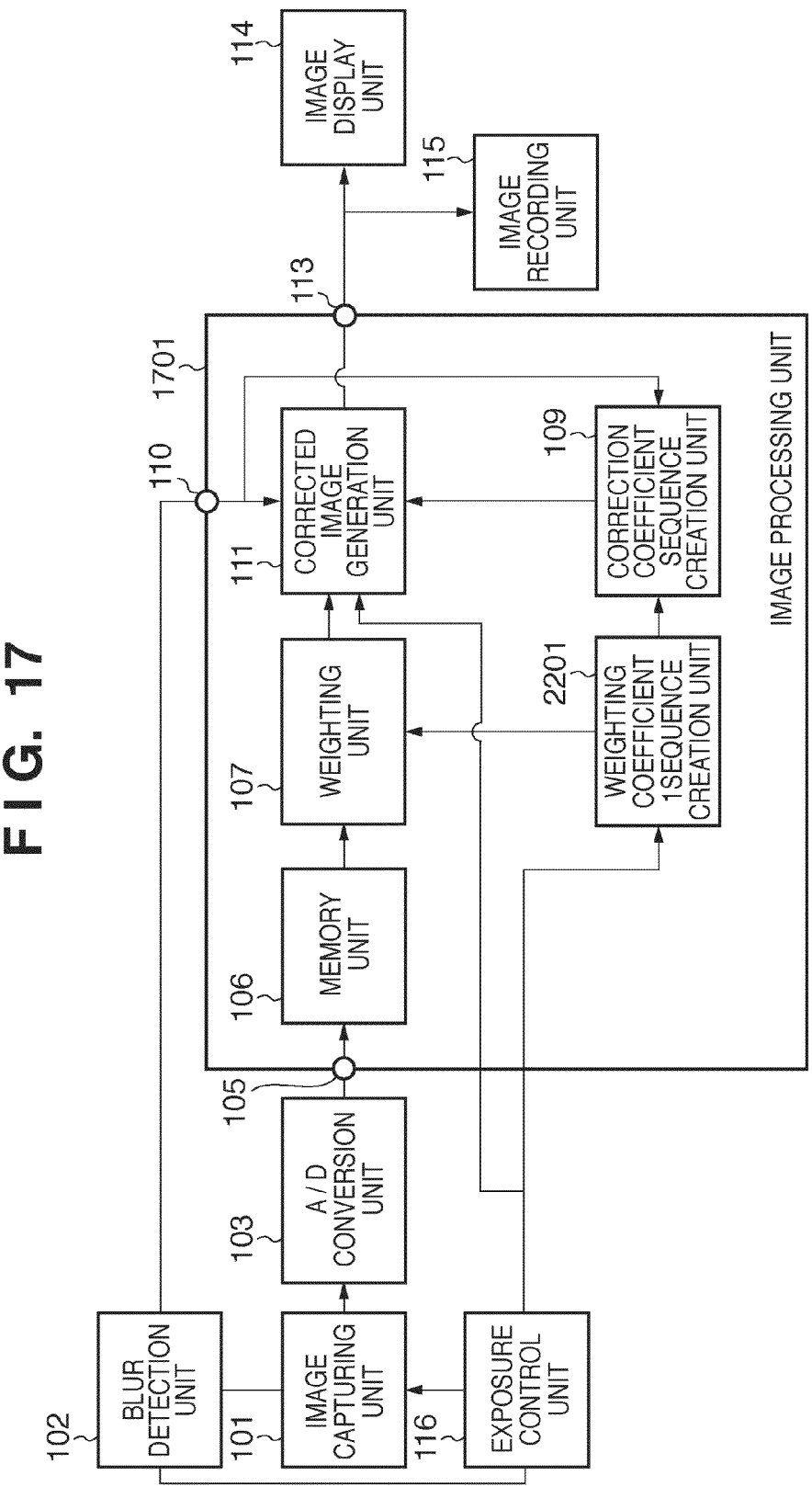
FIG. 17 is a block diagram exemplifying the functional arrangement of an image processing apparatus.

The functional arrangement of the image processing apparatus according to the fifth embodiment will be exemplified with reference to the block diagram of FIG. 17. The arrangement in FIG. 17 is configured by omitting the weighting coefficient sequence DB 108 and weighting coefficient sequence defining unit 112 from the arrangement of FIG. 1A, and adding a weighting coefficient sequence creation unit 2201.

The weighting coefficient sequence creation unit 2201 creates an appropriate weighting coefficient in accordance with the number of captured images supplied from an exposure control unit 116. The remaining processing units are the same as those in the first embodiment.

<Creation of Weighting coefficient Sequence>

Figure 18:
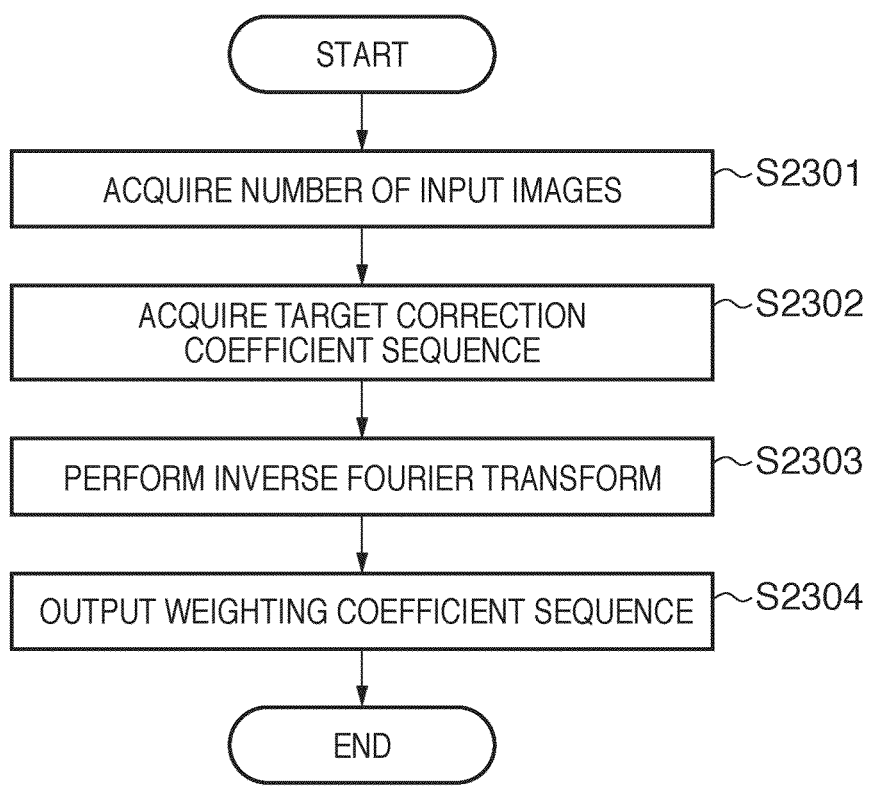
FIG. 18 is a flowchart showing processing performed by a weighting coefficient sequence creation unit 2201.

Processing performed by the weighting coefficient sequence creation unit 2201 will be explained with reference to FIG. 18 which is a flowchart showing this processing. In step S2301, the weighting coefficient sequence creation unit 2201 acquires the number L of captured images from the exposure control unit 116.

In step S2302, the weighting coefficient sequence creation unit 2201 acquires a correction coefficient sequence created in advance from a memory (not shown) or the like within the image processing apparatus. This correction coefficient sequence is formed from 1D frequency response values as shown in FIG. 4A. In the fifth embodiment, the correction coefficient sequence is set so that the frequency response value becomes relatively large, as indicated by the solid line in FIG. 4A. This correction coefficient sequence is given by W4(u) where u is the frequency of the x component.

In step S2303, the weighting coefficient sequence creation unit 2201 performs 1D inverse Fourier transform processing for the correction coefficient sequence W4(u), obtaining a weighting coefficient sequence w4. The 1D inverse Fourier transform processing complies with equation (17):

$$w4(l) = IFFT1(W4(u)) \quad (17)$$

where IFFT1( ) is the function representing a 1D inverse Fourier transform. In step S2304, the weighting coefficient sequence creation unit 2201 outputs the weighting coefficient sequence w4 obtained in step S2303 to a weighting unit 107 and correction coefficient sequence creation unit 109.

In the fifth embodiment, the correction coefficient sequence W4 is set so that the frequency response value becomes relatively large. However, the correction coefficient sequence may be set in accordance with another characteristic of the frequency response value. For example, the correction coefficient sequence W4 may be set so that a response value of almost 1 is obtained at all frequencies, as indicated by the solid line in FIG. 4B.

The fifth embodiment has explained a case in which captured images are acquired by time-division exposure. However, the weighting coefficient sequence creation unit 2201 is also applicable to the third and fourth embodiments. In this case, the number of images to be acquired is defined before shooting, and a transmittance pattern suited to the defined number of images to be acquired is generated according to the sequence shown in FIG. 18.

As described above, the fifth embodiment can perform blur correction or blur modification/removal for a captured image by obtaining a proper weighting coefficient sequence by calculation in shooting. Further, the fifth embodiment can omit a memory which holds a database for storing a weighting coefficient sequence. It will readily occur to those skilled in the art that the above-described embodiments can be properly combined.

[Sixth Embodiment]

The building units of the image processing unit shown in FIG. 1A (6), 9, 12A (14A), 15A, or 17 may be implemented by hardware. Alternatively, some or all the units other than the memory unit may be implemented by software (computer program). In this case, the software is stored in the internal memory of the image processing apparatus and executed by the internal control circuit (for example, CPU) of the image processing apparatus.

Also, the image processing unit shown in FIG. 1A (6), 9, 12A (14A), 15A, or 17 and the remaining functional units may be configured as separate devices. For example, when an image capturing device such as a digital camera, and a computer apparatus such as a PC (Personal Computer are connected, the image processing unit may be implemented as the computer apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-126291 filed Jun. 1, 2010 which is hereby incorporated by reference herein in its entirety.

What is claimed is:

1. An image processing apparatus comprising:
   a first acquisition unit configured to acquire a weighting coefficient sequence including weighting coefficients by which respective captured image data captured by an image capturing device are to be multiplied, the weighting coefficient sequence including at least a ternary weighting coefficient;
   an input unit configured to input a plurality of the captured image data captured by the image capturing device;
   a second acquisition unit configured to acquire a motion vector from an image represented by the captured image data when acquiring the plurality of the captured image data;
   a synthesis unit configured to multiply the respective captured image data by corresponding weighting coefficients of the weighting coefficient sequence, and synthesize the respective captured image data multiplied by the weighting coefficients, acquiring synthesized image data; and
   a correction unit configured to correct the synthesized image data based on the motion vector and the weighting coefficient sequence, acquiring corrected image data.

2. The apparatus according to claim 1, wherein the weighting coefficient sequence includes a positive weighting coefficient and a negative weighting coefficient.

3. The apparatus according to claim 1, wherein the weighting coefficient sequence includes a weighting coefficient larger than 1 or a weighting coefficient smaller than −1.

4. The apparatus according to claim 1, wherein the weighting coefficient sequence is adjusted to increase a frequency component of the weighting coefficient sequence.

5. The apparatus according to claim 1, wherein the weighting coefficient sequence is adjusted to reduce variations of frequency components of the weighting coefficient sequence.

6. A non-transitory computer-readable storage medium storing a computer program for causing a computer to function as each unit of an image processing apparatus defined in claim 1.

7. An image processing method performed by an image processing apparatus, comprising:

a first acquisition step, performed by a first acquisition unit of the image processing apparatus, of acquiring a weighting coefficient sequence including weighting coefficients by which respective captured image data captured by an image capturing device are to be multiplied, the weighting coefficient sequence including at least a ternary weighting coefficient;

an input step, performed by an input unit of the image processing apparatus, of inputting a plurality of the captured image data captured by the image capturing device;

a second acquisition step, performed by a second acquisition unit of the image processing apparatus, of acquiring a motion vector from an image represented by the captured image data when acquiring the plurality of the captured image data;

a synthesis step, performed by a synthesis unit of the image processing apparatus, of multiplying the respective captured image data by corresponding weighting coefficients of the weighting coefficient sequence, and synthesizing the respective captured image data multiplied by the weighting coefficients, acquiring synthesized image data; and a correction step, performed by a correction unit of the image processing apparatus, of correcting the synthesized image data based on the motion vector and the weighting coefficient sequence, acquiring corrected image data.

* * * * *